(12) United States Patent
Ando et al.

(10) Patent No.: US 6,851,609 B2
(45) Date of Patent: Feb. 8, 2005

(54) IMAGE READING APPARATUS AND COPIER

(75) Inventors: Kazuhiro Ando, Saitama (JP); Yukio Noguchi, Kanagawa (JP); Koichi Ichihara, Kanagawa (JP); Youji Mouri, Kanagawa (JP); Fumihiro Kitahara, Kanagawa (JP); Kazuhiko Nakaya, Gifu (JP); Shigefumi Soga, Aichi (JP); Hisatsugu Niki, Gifu (JP)

(73) Assignee: Ricoh Company, Ltd., Tokyo (JP)

( * ) Notice: Subject to any disclaimer, the term of this patent is extended or adjusted under 35 U.S.C. 154(b) by 300 days.

(21) Appl. No.: 09/983,860

(22) Filed: Oct. 26, 2001

(65) Prior Publication Data

US 2002/0050520 A1 May 2, 2002

(30) Foreign Application Priority Data

Oct. 27, 2000 (JP) ........................................ 2000-329413

(51) Int. Cl.$^7$ .............................. G06K 7/10; G06K 7/14
(52) U.S. Cl. ........................ 235/454; 235/455; 235/461; 250/315.3; 250/317.1; 250/582; 250/583
(58) Field of Search .................................. 358/461, 471, 358/469, 483, 288, 285; 250/208.1, 317.1, 315.3; 382/274; 235/454, 375, 385, 455, 461; 399/130; 355/67

(56) References Cited

U.S. PATENT DOCUMENTS

| | | | |
|---|---|---|---|
| 4,748,514 A | | 5/1988 | Bell |
| 5,099,341 A | | 3/1992 | Nosaki et al. |
| 5,151,796 A | * | 9/1992 | Ito et al. .................... 358/461 |
| 5,282,060 A | * | 1/1994 | Kizu et al. .................. 358/461 |
| 5,331,433 A | * | 7/1994 | Sato ........................... 358/471 |
| 5,513,018 A | * | 4/1996 | Nisimura .................... 358/474 |
| 5,847,839 A | * | 12/1998 | Nakamura et al. ......... 358/404 |
| 5,970,181 A | | 10/1999 | Ohtsu |
| 5,970,183 A | * | 10/1999 | Amemiya et al. .......... 382/282 |
| 6,229,627 B1 | * | 5/2001 | Taguchi et al. ............ 358/461 |
| 6,301,019 B1 | * | 10/2001 | Saito et al. ................. 358/461 |
| 6,489,601 B1 | * | 12/2002 | Huang ..................... 250/208.1 |

FOREIGN PATENT DOCUMENTS

| | | | | |
|---|---|---|---|---|
| EP | 0 964 569 | | 12/1999 | |
| GB | 2 232 844 | | 12/1990 | |
| JP | 10-308849 | | 11/1998 | |
| JP | 2000-122188 | | 4/2000 | |
| JP | 2002016769 A | * | 1/2002 | ............ H04N/1/19 |
| JP | 2003152958 A | * | 5/2003 | ............ H04N/1/04 |

* cited by examiner

*Primary Examiner*—Karl D. Frech
*Assistant Examiner*—Daniel Walsh
(74) *Attorney, Agent, or Firm*—Oblon, Spivak, McClelland, Maier & Neustadt, P.C.

(57) ABSTRACT

An image reading apparatus includes a line sensor for reading an image of an original, a scanning optical system that has a light source and scans the original, a reference reflection member provided in such a position as to reflect a light emitted from the light source, a buffer memory for storing data of the image, an intermittent reading part interrupting and restarting scanning performed by the scanning optical system based on a residual storage capacity of the buffer memory, and a light amount variation correction part correcting a variation in an amount of light of the light source during an interruption of the scanning based on an amount of reflected light from the reference reflection member.

34 Claims, 23 Drawing Sheets

IMAGE READING APPARATUS AND COPIER

BACKGROUND OF THE INVENTION

1. Field of the Invention

The present invention relates to an image reading apparatus such as an image scanner used by being connected to an external apparatus such as a personal computer or a scanner part provided in a copier or a facsimile machine, and to a copier including such an image reading apparatus.

2. Description of the Related Art

An image scanner including a buffer memory for storing read image data is connected to a PC or a network of lines to which the image data stored in the buffer memory is output. In this case, depending on the data processing capability of the PC or the network of lines or on a data transfer rate at which the image data is output from the buffer memory, the image scanning capability of the image scanner may not be balanced with the data transfer rate. Therefore, the conventional image scanner stops scanning for image reading and waits for the image data in the buffer memory to be transferred to the PC or the network of lines if the buffer memory is filled to its storage capacity.

A great light amount variation (a variation in an amount of light to an elapsed time) is caused in a light source for scanning for image reading during a period immediately after the light source is turned on until the light source is stabilized so as to affect the lightness of an image even if a highly stable Xe lamp is employed as the light source. Further, in the case of a color image, if a white fluorescent lamp is employed as the light source, differences are caused among amounts of light of colors of R (red), G (green), and B (blue) even though the same period of time passes. Therefore, a color difference is caused between images on the leading and trailing edges of one frame.

Therefore, if the above-described stoppage of the scanning for image reading lasts for more than a few seconds due to the fact that the buffer memory is filled to its storage capacity, the effect of the light amount variation in the light source for exposure scanning becomes more apparent in the image (in terms of lightness or color difference). A change in the image is great and extremely noticeable particularly at a joint of partial images read before and after the stoppage of the scanning for image reading. This results in a problem of deterioration of image quality.

In order to solve such a problem, correction of a variation in a read image caused by a variation with time in the amount of light of a light source (hereinafter referred to as light amount variation correction) is performed, as disclosed in Japanese Laid-Open Patent Application No. 10-308849. According to a technique disclosed therein, a reference reflection member is provided in a sub scanning direction to intercept a stray light included in a reflected light from an original document so that light amount correction is properly performed. Further, since a light source characteristically has its illuminance increased or decreased monotonously from a read start side to a read end side, a read correction error is reduced even if a displacement or shift occurs in an optical system.

If the light source continues to be on after the power switch of the image scanner is turned on, the amount of light is stabilized in a few minutes thereafter. Therefore, from that moment, only a small variation is caused in the amount of light. In this case, however, the light source is kept on for a long period of time in other operations than a scanning operation for image reading. This inappropriately causes a problem of a shortened light source life.

However, according to the technique disclosed in Japanese Laid-Open Patent Application No. 10-308849, since a light reflected from the reference reflection member is detected in different positions in the sub scanning direction every time, a strict level of reflection uniformity in the sub scanning direction is required of the reference reflection member. Therefore, it is necessary to paint or apply a decal to the base material, which is a metal or resin, of the reference reflection member so as to achieve uniformity of the reflection surface thereof, thus resulting in an increase in costs.

Further, since a strict level of reflection uniformity in the sub scanning direction is required of the reference reflection member, the light amount correction is not normally performed at the time of reading the reflected light using a position on the reference reflection member if the position is dirty.

Furthermore, since the light amount correction, which is performed in a short period of time in an interval during motor control or image processing control, applies a large amount of load to a central processing unit (CPU) in control of each part. Therefore, depending on the processing capability of the CPU, another problem is caused that image processing capability should be decreased by reducing a rate of scanning for image reading so as to reduce the load on the control of the CPU.

SUMMARY OF THE INVENTION

It is a general object of the present invention to provide an image reading apparatus and a copier in which the above-described disadvantages are eliminated.

A more specific object of the present invention is to provide an image reading apparatus and a copier that can correct a variation in an amount of light with high accuracy even without uniform reflectivity of a reference reflection member.

Another more specific object of the present invention is to provide an image reading apparatus and a copier that can resist noises resulting from contamination on the reference reflection member due to the passage of time.

Yet another more specific object of the present invention is to provide an image reading apparatus and a copier that can increase throughput.

The above objects of the present invention are achieved by an image reading apparatus including a line sensor for reading an image of an original, a scanning optical system that has a light source for illuminating the original and scans the original so that the line sensor reads the image, a reference reflection member provided in such a position as to reflect a light emitted from the light source, a buffer memory for storing data of the image read by the line sensor, an intermittent reading part interrupting and restarting scanning performed by the scanning optical system based on a residual storage capacity of the buffer memory, and a light amount variation correction part correcting a variation in an amount of light of the light source during an interruption of the scanning based on an amount of reflected light from the reference reflection member.

According to the above-described image reading apparatus, a reflected light from the reference reflection member is always detected at the same position thereon since the variation in the amount of light of the light source is corrected with the scanning by the scanning optical system being interrupted. Therefore, the variation in the amount of light of the light source can be corrected with high accuracy even without uniform reflectivity of the reference reflection member. This reduces the production costs of the reference reflection member.

Additionally, the light amount variation correction part may correct the variation in the amount of light of the light source based on a relative value of a first amount of reflected light from the reference reflection member to a second amount of reflected light therefrom, the first and second amounts being detected at different timings.

Therefore, the above-described image reading apparatus can resist noises resulting form contamination on the reference reflection member due to the passage of time.

Additionally, the above-described image reading apparatus may include a correction execution determination part causing the light amount variation correction part to correct the variation in the amount of light of the light source only when required.

Thereby, the above-described image reading apparatus can increase throughput.

The above objects of the present invention are also achieved by a copier including: an image reading apparatus including a line sensor for reading an image of an original, a scanning optical system that has a light source for illuminating the original and scans the original so that the line sensor reads the image, a reference reflection member provided in such a position as to reflect a light emitted from the light source, a buffer memory for storing data of the image read by the line sensor, an intermittent reading part interrupting and restarting scanning performed by the scanning optical system based on a residual storage capacity of the buffer memory, and a light amount variation correction part correcting a variation in an amount of light of the light source during an interruption of the scanning based on an amount of reflected light from the reference reflection member; and an imaging apparatus forming an image on a sheet of paper based on the data of the image read by the image reading apparatus.

According to the above-described copier, a reflected light from the reference reflection member is always detected at the same position thereon since the variation in the amount of light of the light source is corrected with the scanning by the scanning optical system being interrupted. Therefore, the variation in the amount of light of the light source can be corrected with high accuracy even without uniform reflectivity of the reference reflection member. This reduces the production costs of the reference reflection member.

BRIEF DESCRIPTION OF THE DRAWINGS

Other objects, features and advantages of the present invention will become more apparent from the following detailed description when read in conjunction with the accompanying drawings, in which:

FIG. 18 is a graph showing a relationship between a period of time and intensity of light after a lighting lamp is turned on;

FIG. 19 is a graph showing temperature of a lamp tube wall and the intensity of light after the lighting lamp is turned on;

DETAILED DESCRIPTION OF THE PREFERRED EMBODIMENTS

A description will now be given, with reference to the accompanying drawings, of embodiments of the present invention.

First, a description will be given, with reference to FIGS. 1 through 17, of a first embodiment of the present invention. In this embodiment, the present invention is applied to a color image scanner used as an image reading apparatus by being connected to an external apparatus such as a personal computer.

Figure 1:
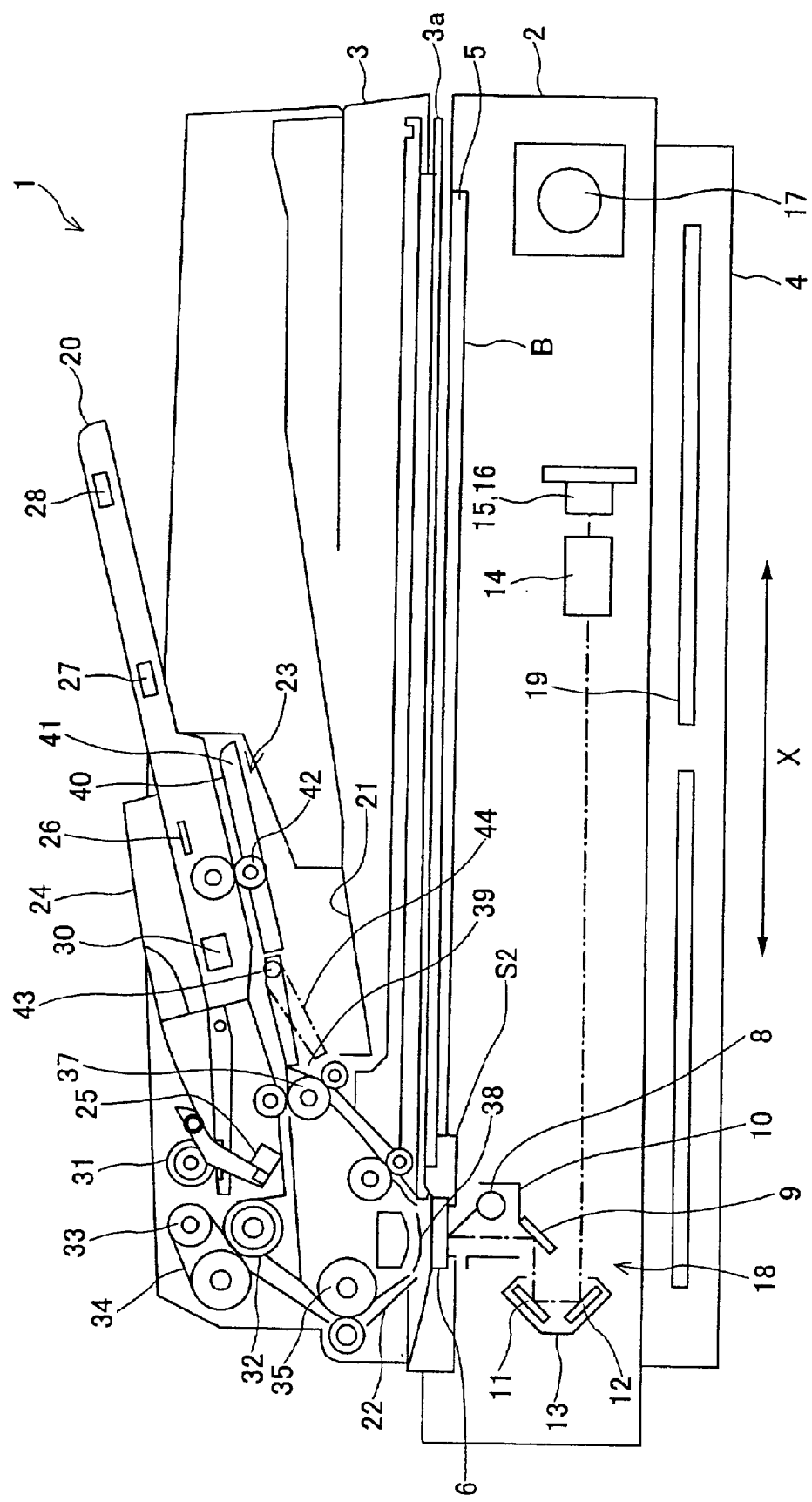
FIG. 1 is a longitudinal sectional view of a color image scanner according to a first embodiment of the present invention and schematically shows an internal structure thereof.
Figure 2A:
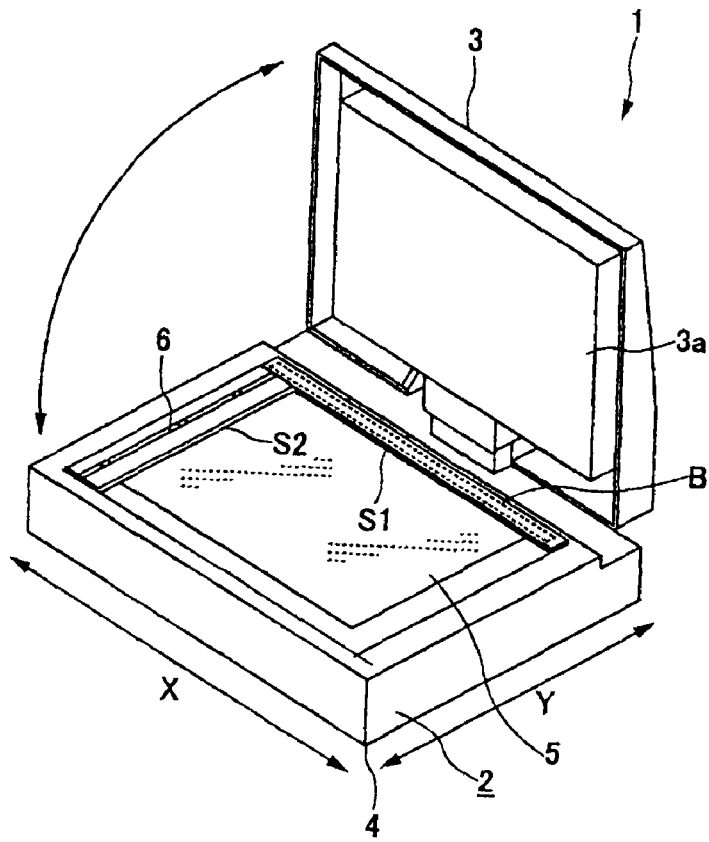
FIG. 2A is a perspective view of the color image scanner.
Figure 2B:
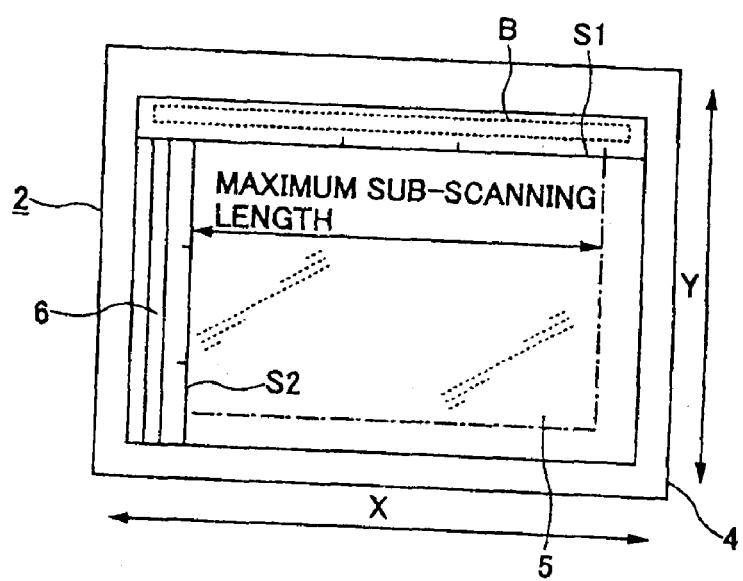
FIG. 2B is a plan view of a scanner main body and a neighborhood thereof of the color image scanner.

FIG. 1 is a longitudinal sectional view of a color image scanner 1 showing schematically an internal structure thereof. FIG. 2A is a perspective view of the color image scanner 1, and FIG. 2B is a plan view of a scanner main body 2 and its neighborhood of the color image scanner 1. As shown in FIGS. 1, 2A, and 2B, the color image scanner 1 includes the scanner main body 2 and an automatic document feeder (ADF) 3 provided on the scanner main body 2. An original sheet pressing member 3a, which is a white resin sheet, is provided at the bottom part of the ADF 3. The original sheet pressing member 3a also functions as a pressing plate.

A description will be given first of the scanner main body 2. A sheet placement glass 5 on which an original (sheet of paper) is placed at the time of reading an original image present on the original in a sheet-fixing mode and a conveyed-sheet glass 6 used at the time of reading the original image in a sheet-conveying mode are provided on the upper surface of a housing 4 of the scanner main body 2. Here, the sheet-fixing mode is an operation mode for reading the image of the original placed on the sheet placement glass 5, and the sheet-conveying mode is an operation mode for reading the image of the original when the original fed automatically by the ADF 3 pass over the conveyed-sheet glass 6.

A main body operation panel 7 (see FIG. 3) including a keyboard (not shown in the drawings) having a variety of keys such as a start key and an abort key and a display (not shown in the drawings) is provided on the outside of the housing 4. The keyboard further includes a sheet specifying key for specifying regular sheet sizes such as A4 and B5, numeric keys for manually inputting an irregular paper size, and a mode key for selecting one of a color reading mode and a monochrome reading mode. None of the above-described keys is shown in the drawings.

A first running body 10 including a lighting lamp (a Xe lamp) 8 that is a light source and a mirror 9 is provided in a position opposing the sheet placement glass 5 below thereof in the housing 4 so as to move freely in a sub scanning direction X along the sheet placement glass 5. In the reflected light path of the first running body 10, a second running body 13 including two mirrors 11 and 12 is provided so as to move freely in the sub scanning direction X along the sheet placement glass 5. In the reflected light path of the second running body 13, a sensor board unit (SBU) that is a charge-coupled device (CCD) driving unit and includes a color CCD 15 that is a color line sensor is provided with a lens 14 being provided between the mirror 12 and the SBU 16.

The first and second running bodies 10 and 13 are linked to a stepper motor 17 with pulleys and wires (not shown in the drawings) so as to freely move in the same sub scanning direction X with a speed ratio of 2:1 from left to right in FIG. 1. That is, the first and second running bodies 10 and 13 form a scanning optical system. With the two first and second running bodies 10 and 13 thus moving, the color CCD 15 scans and reads the image of the original placed on the sheet placement glass 5 in the sub scanning direction X. An original sheet reading mechanism 18 is thus formed. It is under the setting of the sheet-fixing mode that the original sheet reading mechanism 18 performs scanning for reading the original image with its two running bodies 10 and 13 moving.

The housing 4 contains in a lower part thereof a unit board including a scanner control unit (SCU) 19 that forms an electrical system controlling an operation of the color image scanner 1 including the scanner main body 2 and the ADF 3.

Further, the housing 4 includes inside thereof sheet size sensors 61 for width and 62 for length (see FIG. 3) for detecting the size of the original placed on the sheet placement glass 5 in reading the original in the sheet-fixing mode.

In addition, as shown in FIG. 2B, sheet scales S1 and S2 are provided on end parts of the sheet placement glass 5 for defining a reference reading position used as reference in placing the original on the sheet placement glass 5 and for preventing the sheet placement glass 5 from shifting or coming off. The sheet scale S1 is provided for informing an operator of the size of the original in the sub scanning direction X. The sheet scale S1 is formed of, for instance, a metal member such as a galvanized steel plate and has its upper surface marked with various sheet sizes in the sub scanning direction X. On the other hand, the sheet scale S2 is provided for informing the operator of the size of the original in a main scanning direction Y. The sheet scale S2 is formed of, for instance, a metal member such as a galvanized steel plate and has its upper surface marked with various sheet sizes in the main scanning direction Y. The sheet scale S2 also functions as a glass frame for fixing the conveyed-sheet glass 6. That is, the sheet scale S1 functions as a sheet placement glass fixing member and a sheet size informing member, and the sheet scale S2 functions as a conveyed-sheet glass fixing member and a sheet size informing member.

Further, a sub scanning-directional reference reflection member B is provided on a far side of the sheet placement glass 5 below the sheet scale S1 so as to have its reflection surface facing toward the lighting lamp 8. Here, the far side refers to a side opposite in the main scanning direction Y to a side closer to the operator (a front side), and corresponds to the upper side of the sheet placement glass 5 in FIG. 2B. The reference reflection member B extends in the sub scanning direction X to have a length larger than or equal to a maximum readable sheet length or size in the sub scanning direction. This maximum readable (sheet) length or size may be referred to as a maximum sub-scanning length. In detail, the reference reflection member B extends to the far side in the main scanning direction Y of the conveyed-sheet glass 6 used for reading the original image in the sheet-conveying mode. That is, the reference reflection member B is used in both sheet-fixing and sheet-conveying modes. The lower surface of the reference reflection member B is the reflection surface that is a sheet metal painted with gray of a certain reflectivity or having a decal of the same color applied thereto. The reference reflection member B is thus provided on the far side in the main scanning direction Y of the sheet placement glass 5 so as to prevent the reference reflection member B from being illuminated with a stray light of a reflected light from the original when a light is emitted from the lighting lamp 8 to the reference reflection member. Thereby, later-described light amount variation correction is correctly performed based on a reflected light from the reference reflection member B without being affected by a shaded surface of the original even when the original is placed on the sheet placement glass 5. The reference reflection member B may be formed of a resin as far as the certain reflectivity is secured. Further, since the reference reflection member B has the length larger than or equal to the maximum readable (sub-scanning) length, the later-described light amount variation correction can be performed in the entire region of the original with respect to the sub scanning direction X.

Next, a description will be given of the ADF 3 used under the setting of the sheet-conveying mode. Under the setting of the sheet-conveying mode, the originals fed automatically by the ADF 3 are scanned and read with the first and second running bodies 10 and 13 being stopped in respective home positions below the conveyed-sheet glass 6. The ADF 3 includes a sheet tray 20 on which the original are placed when the originals are read in the sheet-conveying mode, a sheet ejection part 21 onto which the read originals are ejected, a guide path 22 connecting the sheet tray 20 and the sheet ejection part 21, and a reversal part 23 for reversing the original in a double-side reading mode. The double-side reading mode, which is included in the sheet-conveying mode, is an operation mode for scanning and reading the image of a side of the original fed automatically by the ADF 3 by reversing the original after reading and scanning the image of the opposite side of the original.

The sheet tray 20 is provided with a sheet guide 24 that guides both side ends of the original in feeding the placed original to the guide path 22. Further, the sheet tray 20 includes a set sensor 25 for sensing whether the originals are placed on the sheet tray 20, a width size detection sensor 25 and sheet length sensors 27 and 28 for detecting the size of the original placed on the sheet tray 20, and a sheet trailing edge sensor 30 for detecting the trailing edge of the original. In this embodiment, the set sensor 25, the width size detection sensor 26, the sheet length sensors 27 and 28, and the sheet trailing edge sensor 30 are all optical sensors of a reflection type. In the sheet-conveying mode, even if no sheet size is specified by the sheet specifying key or the numeric keys, the size of the original placed on the sheet tray 20 is automatically specified by these sensors.

A pickup roller 31 and a separation roller 32 for feeding the originals placed on the sheet tray 20 separately from one another, and a feeding belt 34 rotated by a conveying roller 33 to convey the original to the conveyed-sheet glass 6 are provided on the side of the sheet tray 20 in the guide path 22. A feed motor (not shown in the drawings) drives the pickup roller 31, the separation roller 32 and the conveying roller 33. That is, the originals placed on the sheet tray 20 are fed one by one to the guide path 22 by the feed motor rotating the pickup roller 31, the separation roller 32, and the conveying roller 33.

In addition, first and second conveying rollers 35 and 36 for conveying the original and a sheet ejection roller 37 for conveying the original in the guide path 22 to the sheet ejection part 21 are provided in the guide path 22. The conveyed-sheet glass 6 is positioned between the first and second conveying rollers 35 and 36 in the guide path 22. A stepper motor 52 (see FIG. 3) drives the first and second conveying rollers 35 and 36 and the sheet ejection roller 37. Further, a belt-like guide member 38, which is a conveying path formation member forming a part of the guide path 22, is provided above the conveyed-sheet glass 6 so as to extend in the main scanning direction Y between the first and second conveying rollers 35 and 36. The guide member 38 is also used for shading correction of the color CCD 15. Therefore, the original fed from the sheet tray 20 to the guide path 22 is guided between the guide member 38 and the conveyed-sheet glass 6 with the stepper motor 52 rotating the first and second conveying rollers 35 and 36 and the sheet ejection roller 37.

The reversal part 23 has a reversal table 41 provided therein. The reversal table 41 forms a reversal path 40 whose one end communicates with a fork at which the guide path 22 branches on its way. A reversal roller 42, which is rotated freely in forward and reverse directions by a feed/reversal motor 51 (see FIG. 3), is provided in the reversal table 41. Further, a switching claw 44 is provided in the reversal path 40 so as to be turnable on a support shaft 43. The switching claw 44 directs the original conveyed by the sheet ejection roller 37 to either the reversal part 23 or the sheet ejection part 21 by opening or closing the reversal path 40 to the guide path 22 by the rotation of the support shaft 43. That is, under the setting of the double-side reading mode that is included in the sheet-conveying mode, the switching claw 44 opens the reversal path 40 to the guide path 22 by the rotation of the support shaft 43 and guides the original conveyed by the sheet ejection roller 37 to the reversal path 40. Thereafter, the switching claw 44 guides the upside-down original again to the guide path 22 with the reversal roller 42.

Since the flows of feed and conveying operation and reversal operation of the originals in each of the sheet-fixing mode, the sheet-conveying mode, and the double-side reading mode that is included in the sheet-conveying mode are technically well-known, a description thereof will be omitted.

Next, a description will be given of a block configuration and basic effects of the electrical system of the color image scanner 1 which electrical system is provided in the lower part of the housing 4.

Figure 3:
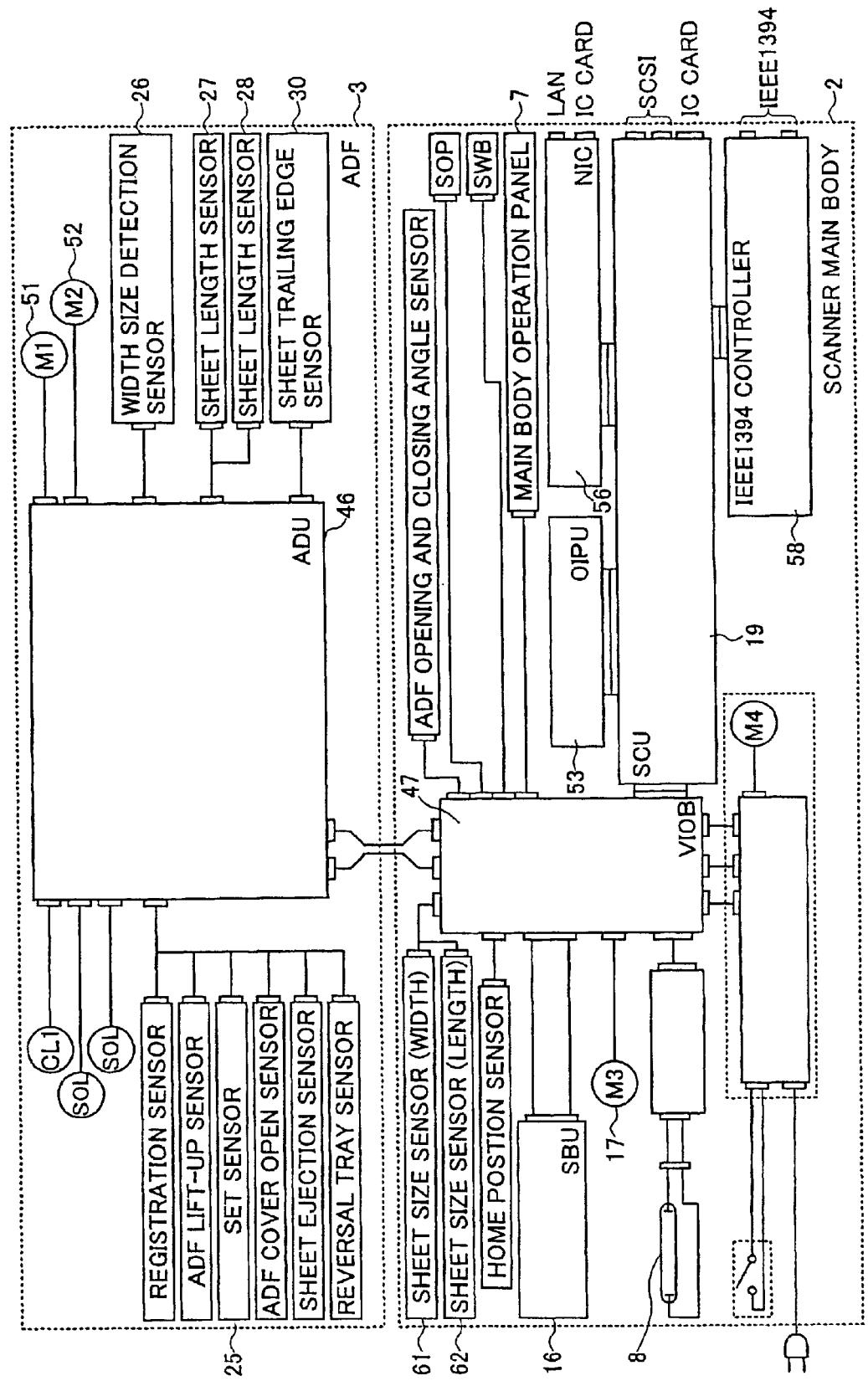
FIG. 3 is a block diagram showing a configuration of an electrical system of the color image scanner.
Figure 4:
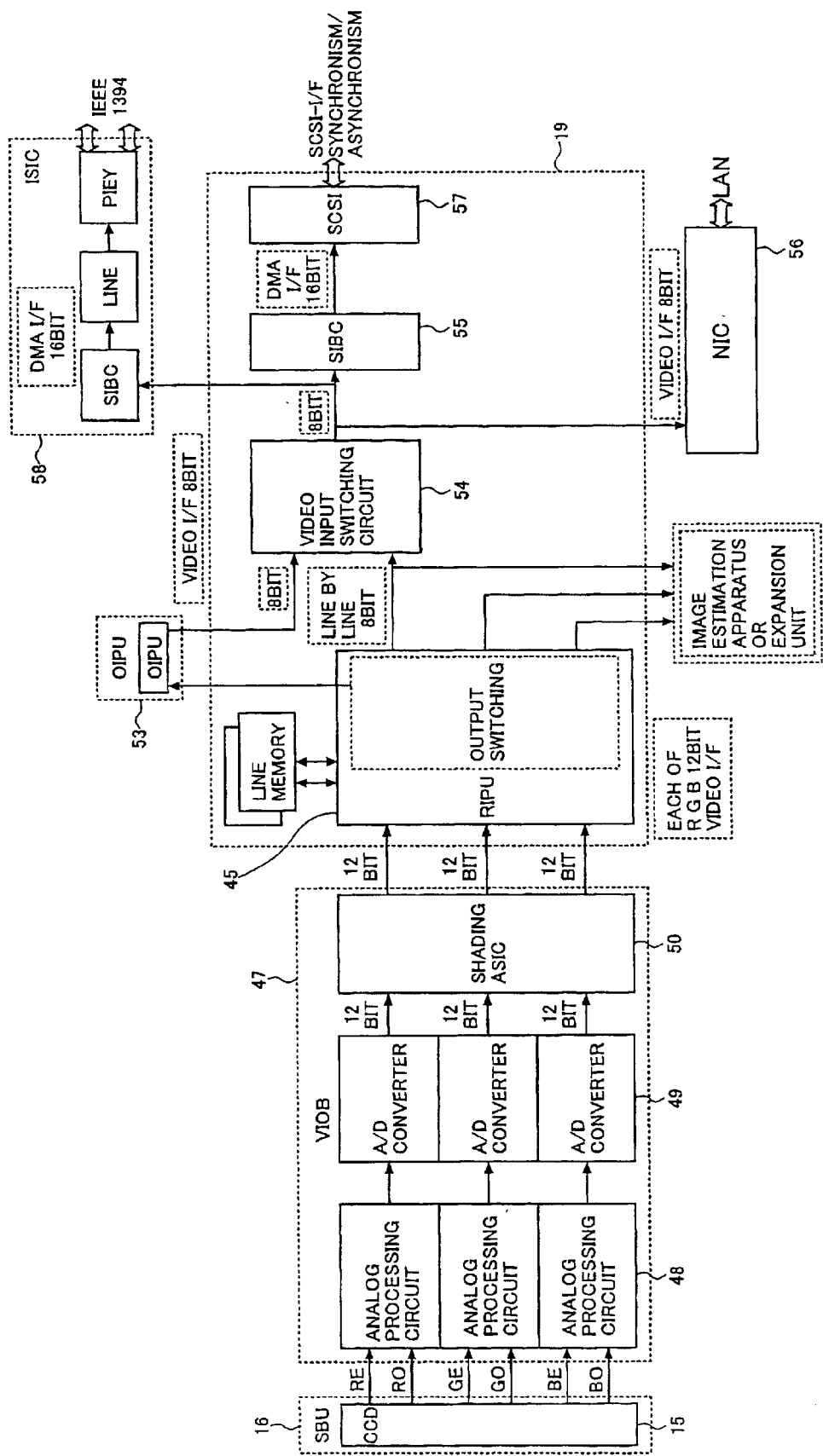
FIG. 4 is a block diagram showing a part of the configuration of the electrical system in detail.
Figure 5:
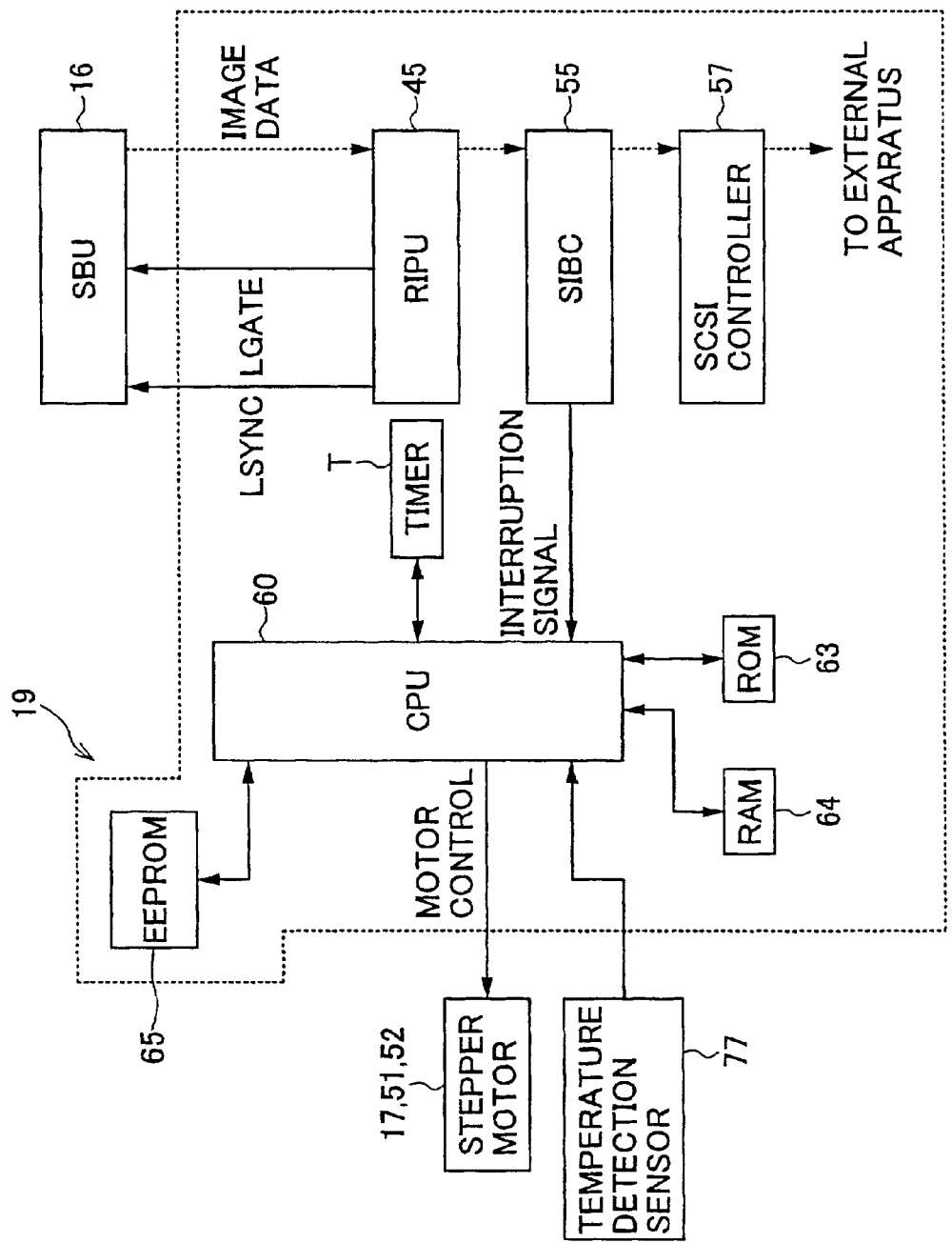
FIG. 5 is a block schematic diagram schematically showing image data flow of the color image scanner.

FIG. 3 is a block diagram showing a configuration of the electrical system of the color image scanner 1. FIG. 4 is a block diagram showing a part of the configuration in detail. FIG. 5 is a block schematic diagram of a flow of image data. A reflected light from the original which light is made incident on the color CCD 15 is converted, in the SBU 16, into analog image signals of colors of R, G, and B each having a voltage value corresponding to the intensity of light in the color CCD 15. Each analog image signal is output from the SBU 16, being divided into even bits and odd bits. Each analog image signal has a dark potential part removed from each of the even bits and the odd bits, has the even bits and odd bits composed, and is gain-adjusted to a predetermined amplitude in a corresponding one of analog processing circuits 48 of a VIOB 47. Thereafter, each analog image data is input to a corresponding one of analog-to-digital (A/D) converters 49 of the VIOB 47 and is converted into a digital signal. Each digitized (digital) image signal is subjected to shading correction in a shading application specific integrated circuit (shading ASIC) 50 of the VIOB 47. The VIOB is also connected to an ADF driving unit (ADU) 46 having a function of relaying a power supply to electrical system components for the ADF 3, such as the set sensor 25, the width size detection sensor 26, the sheet length sensors 27 and 28, and the sheet trailing edge sensor 30).

After each digital image signal is subjected to image processing such as y correction and modulation transfer function (MTF) correction in an RIPU 45 that is an image processing LSI of the SCU 19, the digital image signals are output to an option image processing unit (OIPU) 53 together with a synchronization signal and an image clock signal as a video signal. After being subjected to given image processing in the OIPU 53, the video signal is again output to the SCU 19, where the video signal is input to a video input switching circuit 54. The other input to the video input switching circuit 54 is the video signal output from the RIPU 45 so that it can be determined whether to subject the video signal to image processing in the OIPU 53. The video signal output from the video input switching circuit 54 is input to a scanner image buffer controller (SIBC) 55 that is a memory control LSI managing a synchronous DRAM (SDRAM) (not shown in the drawings) that is a buffer memory, and is stored in the SDRAM as image data. The image data stored in the SDRAM is successively output to a small computer system interface (SCSI) controller 57 and is transferred to an external apparatus (not shown in the drawings) such as a personal computer.

The video signal is also output, as required, from the video input switching circuit 54 to a network interface card (NIC) 56 or an IEEE1394 controller 58 that is an expansion board for an additional communication function for connecting the color image scanner 1 via a local are network (LAN) to an external apparatus such as a personal computer. The external apparatus connected via the NIC 56 or the IEEE1394 controller 58 to the color image scanner 1 may be attached externally to or housed inside the color image scanner 1.

As shown in FIG. 5, mounted on the SBU 19 are a CPU 60 performing centralized control of all the parts of the color image scanner 1, a ROM 63 prestoring fixed data such as a control program, a RAM 64 rewritably storing variable data such as image reading condition data and calculation comparison data, an electrical-erasable programmable ROM (EEPROM) 65 storing data to be retained even when the power is off, such as the operation time of each load of the color image scanner 1, the number of paper jams, and the set values of individual functions, and a timer T having a time count function of counting time. Therefore, the CPU 60 controls each part of the color image scanner 1 in accordance with the control program prerecorded on the ROM 63. For instance, the CPU 60 controls the SCSI controller 57 and the NIC 56 and/or the IEEE1394 controller 58 so as to communicate with the external apparatus such as a personal computer. Further, the CPU 60 controls timing of the stepper motor 17, the feed/reversal motor 51 of the ADF 3, and the stepper motor 52 through a motor driver (not shown in the drawings). In addition, the CPU 60 is connected through an A/D converter circuit (not shown in the drawings) to a temperature detection sensor 77 that is a thermistor for measuring temperature of a lamp tube wall of the lighting lamp 8.

Next, a description will be given, with reference to FIG. 5, of the flow of the image data. The RIPU 45 mounted on the SCU 19, under the control of the CPU 60, outputs to the SBU 16 including the color CCD 15 a main scanning line synchronization signal LSYNC that is a synchronization signal in a main scanning line direction and a gate signal LGATE that represents an output period of main scanning line data. The SBU 16 outputs the analog image signals of the colors of R, G, and B photoelectrically converted in the color CCD 15 to the RIPU 45 in accordance with the main scanning line synchronization signal LSYNC and the gate signal LGATE output from the RIPU 45. The CPU 60 controls such an ON-OFF operation of the image data output by updating data stored in a register provided inside the RIPU 45 as is well-known in the art. Further, the CPU 60 controls the ON-OFF operation of the image data output based on an interruption signal output from the SIBC 55. The interruption signal is generated if the SDRAM is full, nearly full, or empty. The states of the SDRAM are distinguished by a register provided inside the SIBC 55 as a well-known device.

The main body operation panel 7 including the keyboard and the display is provided on the outer surface of the color image scanner 1. The main body operation panel 7 is also connected via the VIOB to the CPU 60. The main body operation panel 7 includes the start and abort keys (switches), and if any of these keys is pressed down, the CPU 60 detects the press of the key via an input port.

A description will now be given, with reference to FIGS. 6 through 11, of an operation of the color image scanner 1 in interrupting the image data output. This operation realizes an intermittent reading part.

Figure 6:
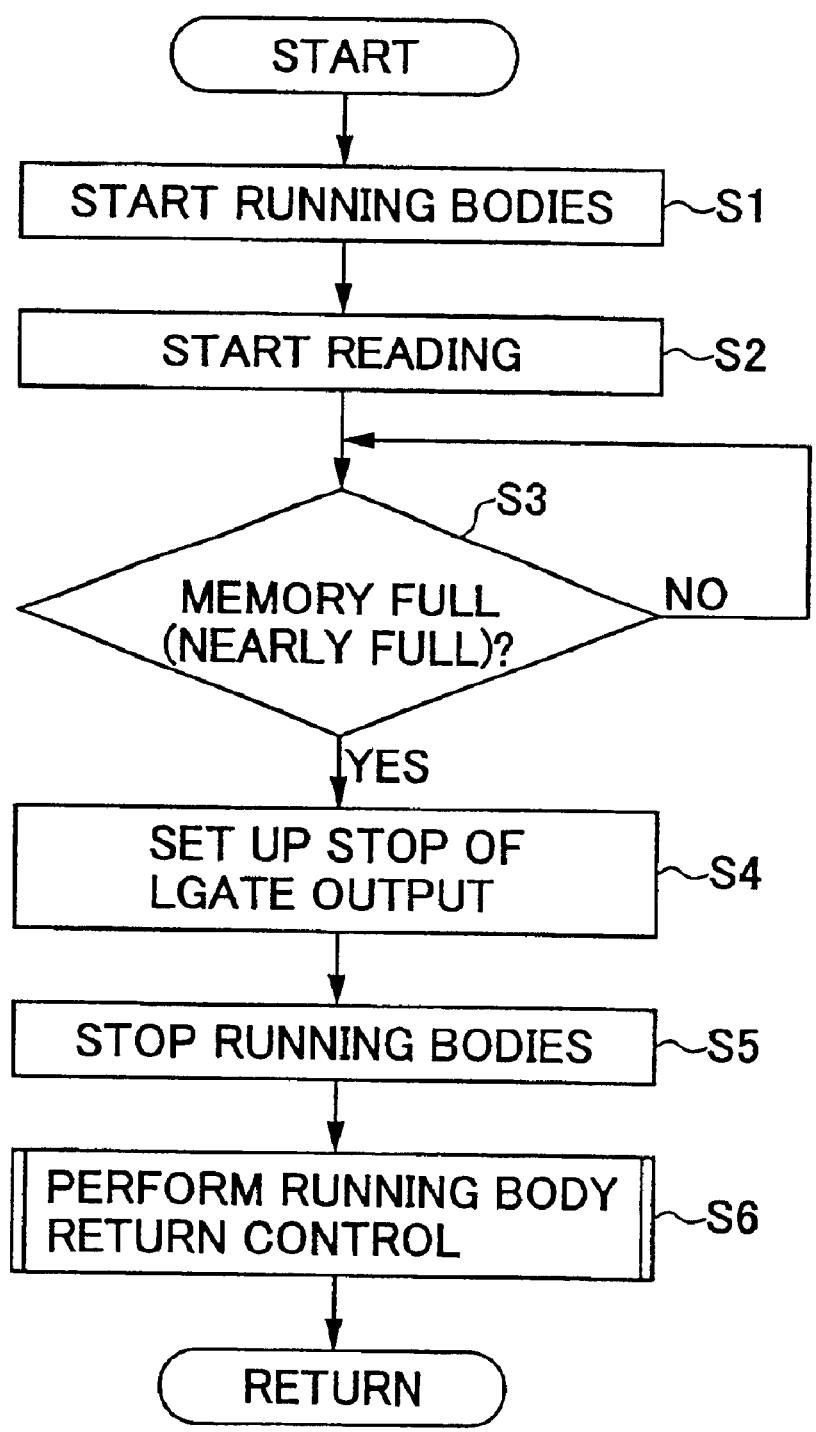
FIG. 6 is a flowchart for illustrating an operation of interrupting image data output in the color image scanner.
Figure 7:
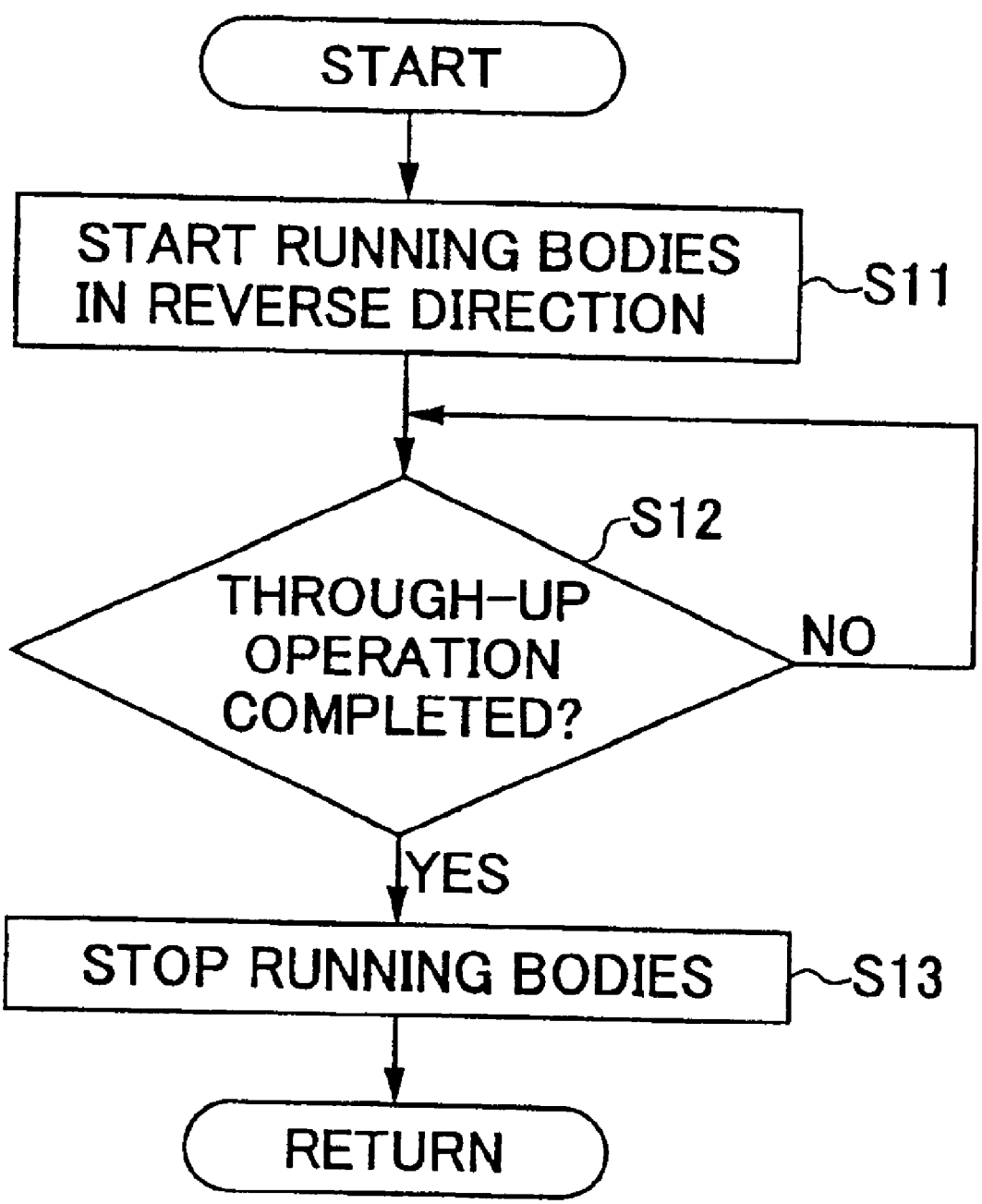
FIG. 7 is another flowchart for illustrating the operation of FIG. 6.

First, in step S1 of FIG. 6, the first and second running bodies 10 and 13 are started by the control of the CPU 60, and in step S2, reading of the originals is started. In step S3, it is determined during the reading of the originals whether or not the SDRAM that is a buffer memory is full or nearly full. Here, "nearly full" refers to a state shortly before the SDRAM is filled to its capacity. If it is determined in step S3 that the SDRAM is full or nearly full, in step S4, the stop of the output of the gate signal LGATE is set up, and in step S5, the first and second running bodies 10 and 13 are stopped (a through-down operation). The main scanning line synchronization signal LSYNC, the gate signal LGATE, an interruption signal MEM NEAR FULL generated when it is determined that the SDRAM is full or nearly full, and a relationship between the velocity and travel distance of each of the first and second running bodies 10 and 13 of this case are shown in a timing chart of FIG. 9.

Next, in step S6, running body return control is performed. The details of this control are described with reference to FIG. 7. That is, the first and second running bodies are moved from stop positions to restart positions by inversely rotating the stepper motor 17. In step S11, the first and second running bodies 10 and 13 are started in a reverse direction by using, as through-up data, data with which the first and second running bodies 10 and 13 are stopped in step S5. In step S12, it is determined whether a through-up operation is completed. If it is determined in step S12 that the through-up operation is completed, in step S13, the first and second running bodies 10 and 13 are stopped by using the same through-up data (a through-down operation). Here, the through-up operation means an operation of gradually increasing a speed, and the through-down operation means an operation of gradually decreasing a speed.

Figure 10:
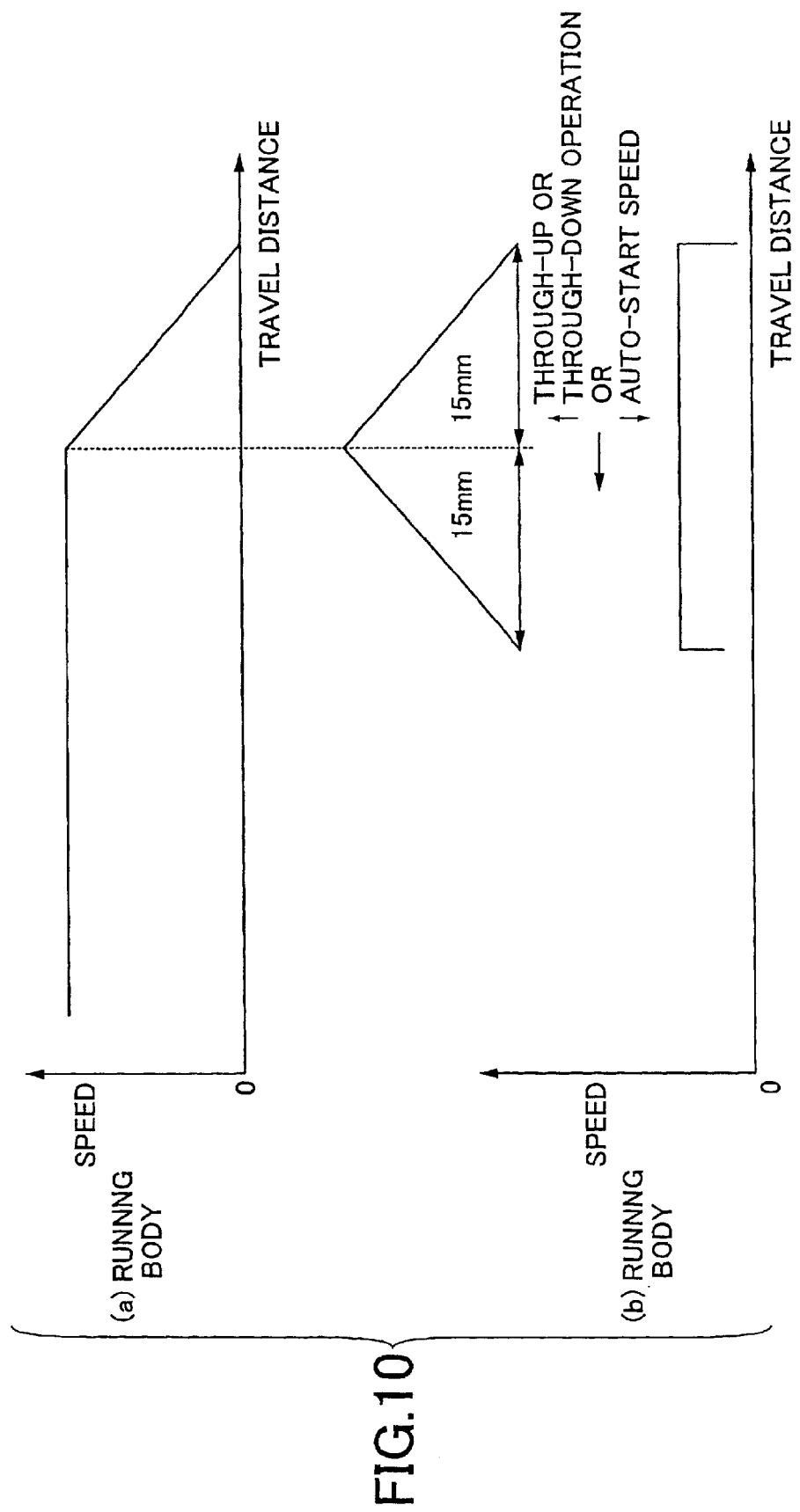
FIG. 10 is a timing chart for illustrating the operation of FIG. 6.
Figure 11:
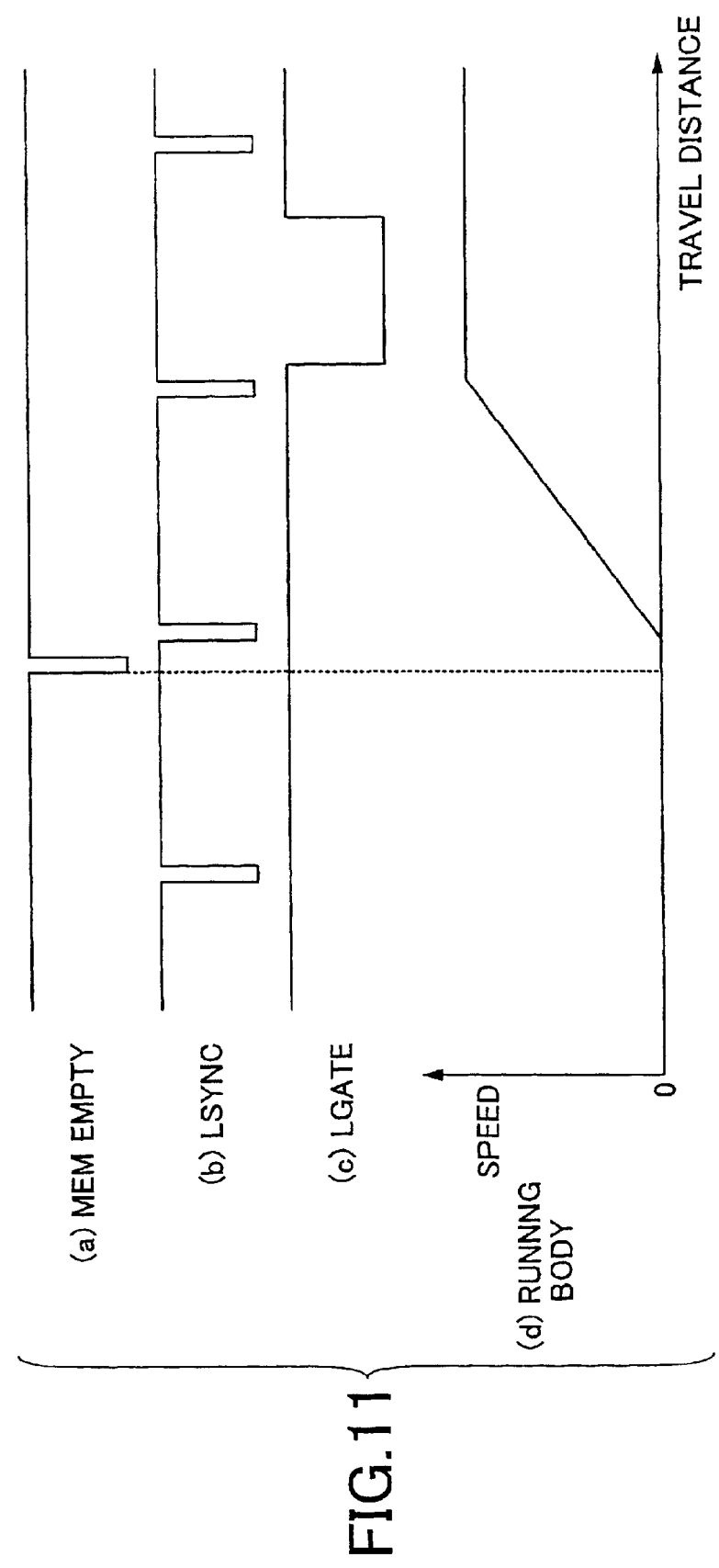
FIG. 11 is a timing chart for illustrating the operation of FIG. 6.

In this case, the first running body 10 is returned by 30 mm by this operation, but may be returned by 30 mm slowly at an auto-start speed as shown in FIG. 10.

Figure 8:
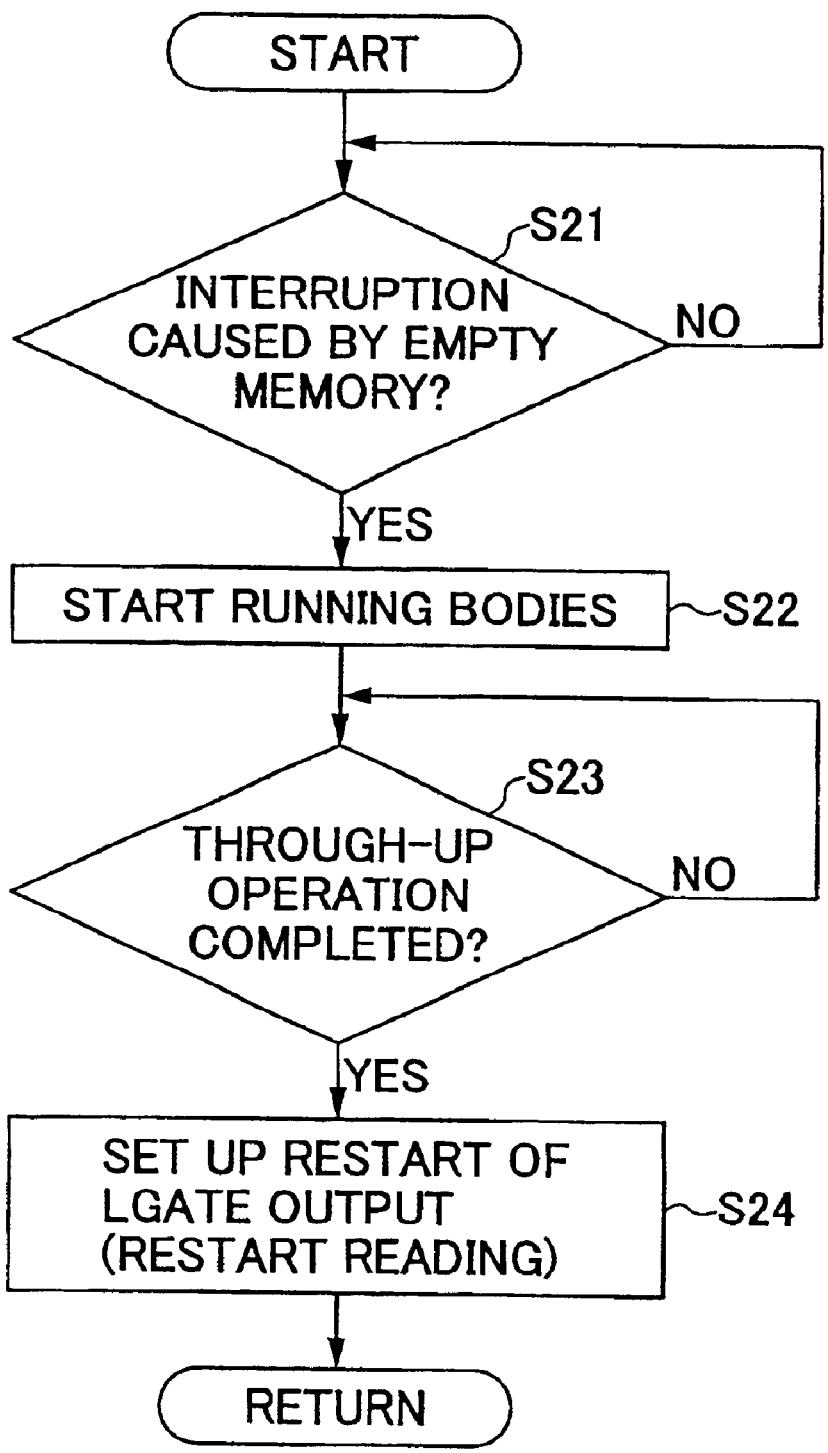
FIG. 8 is another flowchart for illustrating the operation of FIG. 6.
Figure 9:
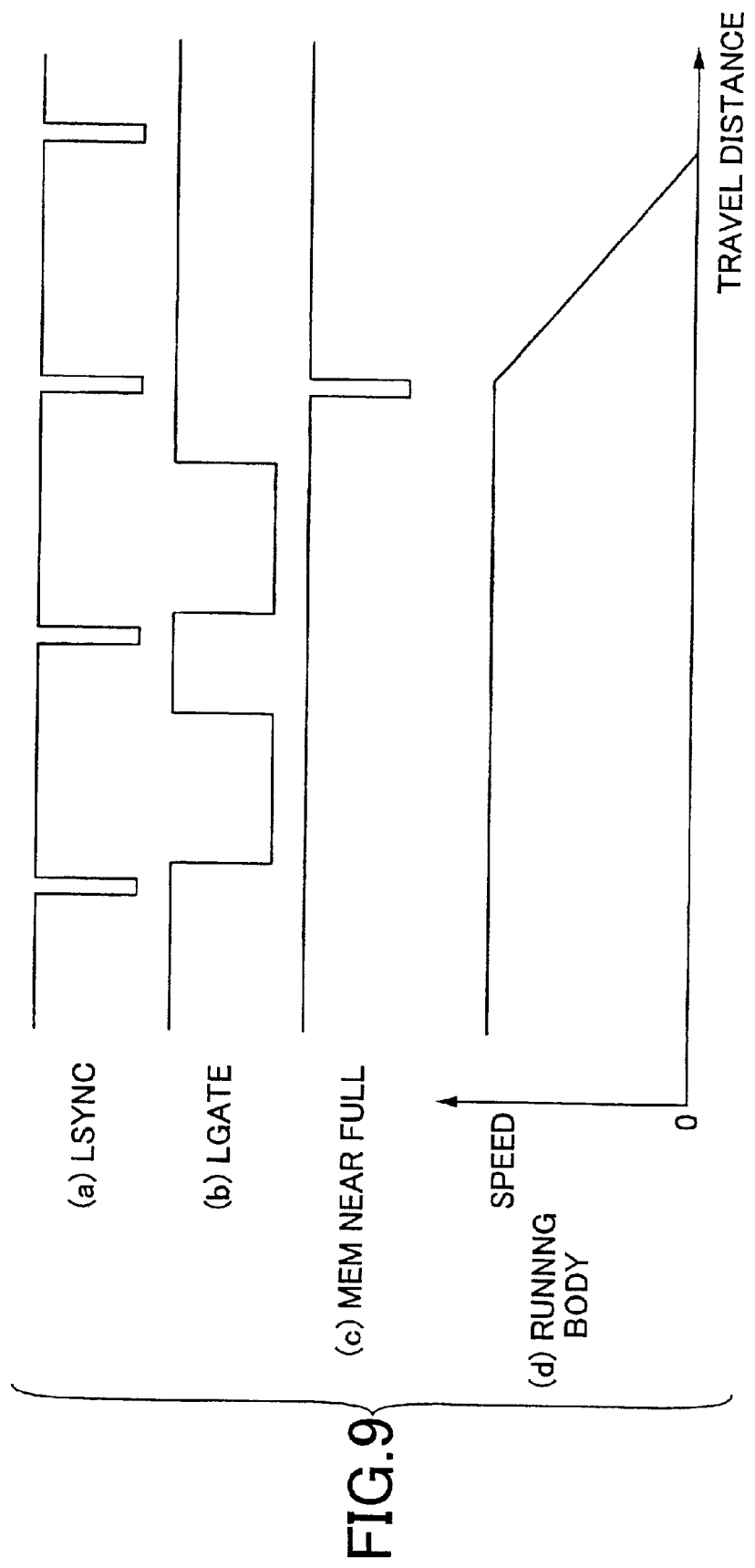
FIG. 9 is a timing chart for illustrating the operation of FIG. 6.

Next, as shown in FIG. 8, an original sheet reading restart operation is performed. In step S21, it is determined whether an interruption has been caused by determining that the SDRAM is empty. If it is determined in step S21 that the interruption has been caused, in step S22, the first and second running bodies 10 and 13 are restarted. Thereafter, in step S23, it is determined whether a through-up operation is completed. If it is determined in step S23 that the through-up operation is completed, in step S24, the reading of the originals is restarted. The main scanning line synchronization signal LSYNC, the gate signal LGATE, an interruption signal MEM EMPTY generated when it is determined that the SDRAM is empty, and a relationship between the velocity and travel distance of each of the first and second running bodies 10 and 13 of this case are shown in a timing chart of FIG. 11.

There exists a well-known technology for reading the originals during the through-up and through-down operations without returning the first and second running bodies 10 and 13 to their respective restart positions. However, that technology is equal to the present invention as an idea of intermittent reading of the originals, and a description thereof will be omitted.

On the other hand, intermittent reading by means of the ADF 3 is performed by the intermittent reading part that performs reading during through-up and through-down operations. An intermittent reading operation by means of the ADF 3 is performed in the following manner.

Figure 12:
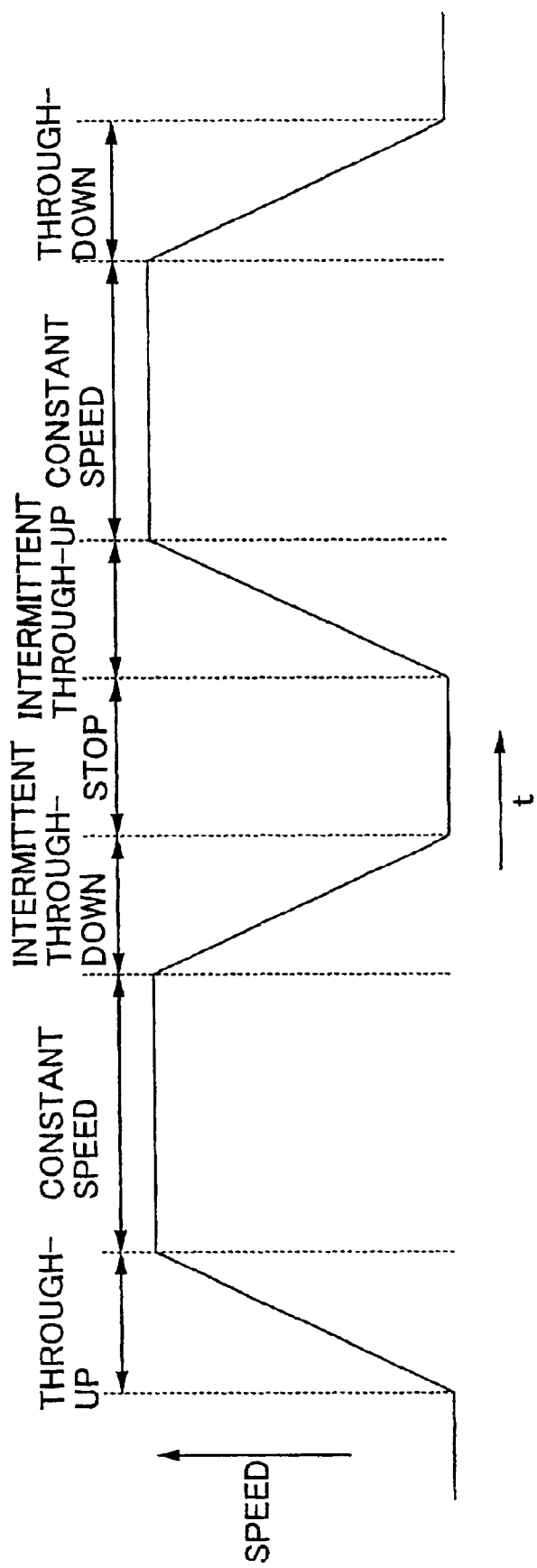
FIG. 12 is a timing chart of change of speed of a stepper motor in an original image reading operation by means of an ADF of the color image scanner.
Figure 13:
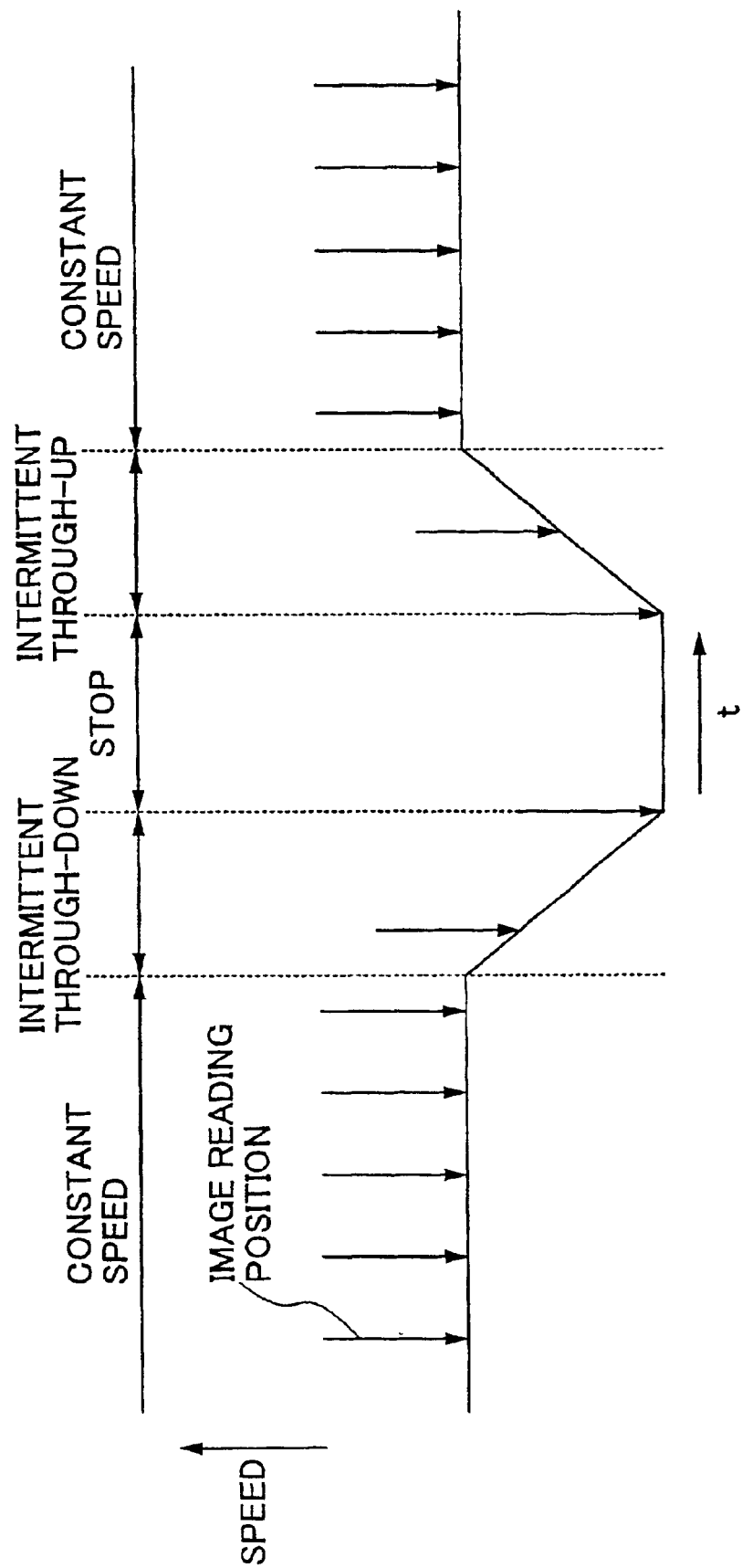
FIG. 13 is a timing chart of change of speed of the stepper motor and image reading in a case of occurrence of an intermittent operation of the stepper motor.
Figure 14:
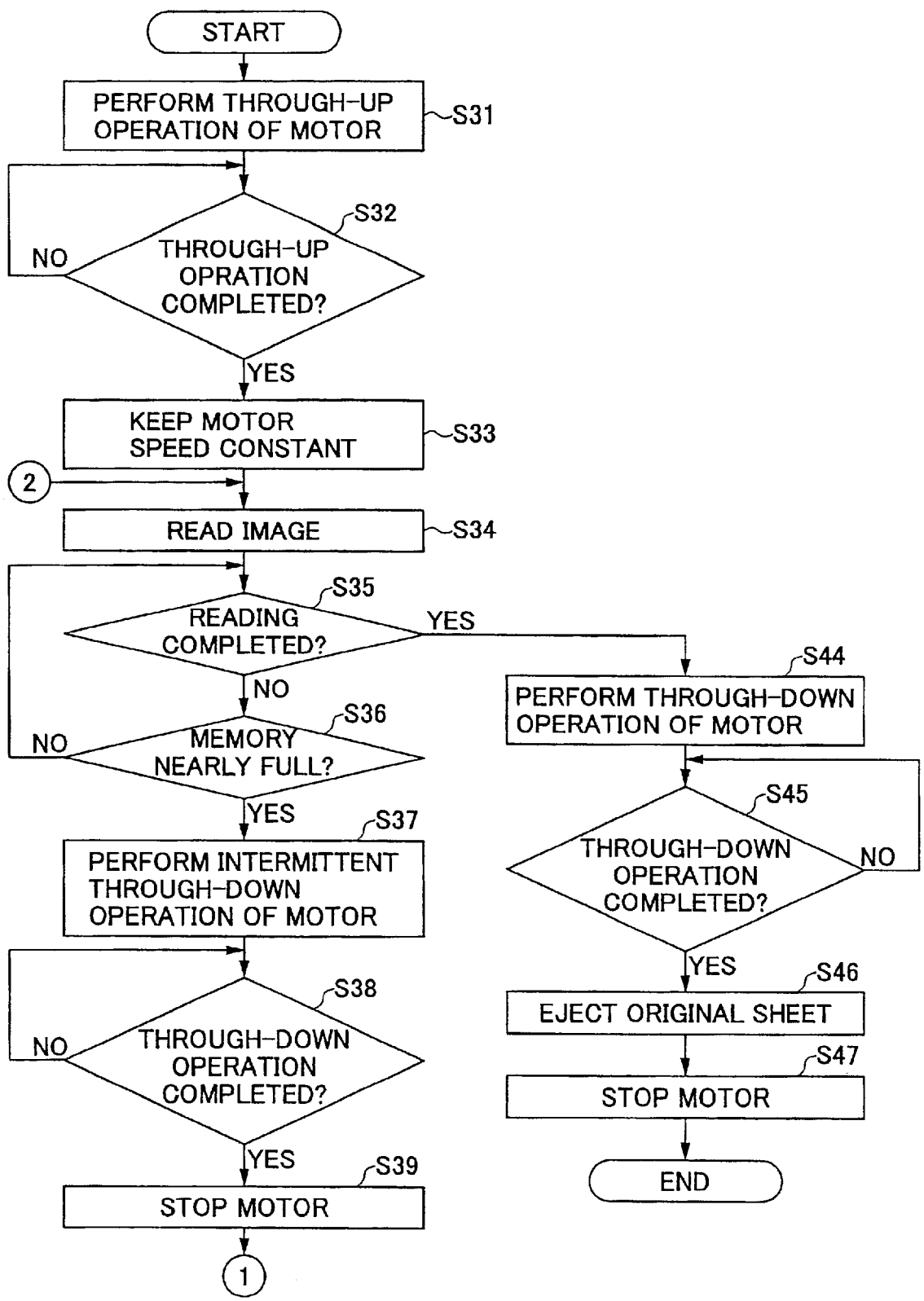
FIG. 14 is a flowchart of an intermittent reading operation of the color image scanner.
Figure 15:
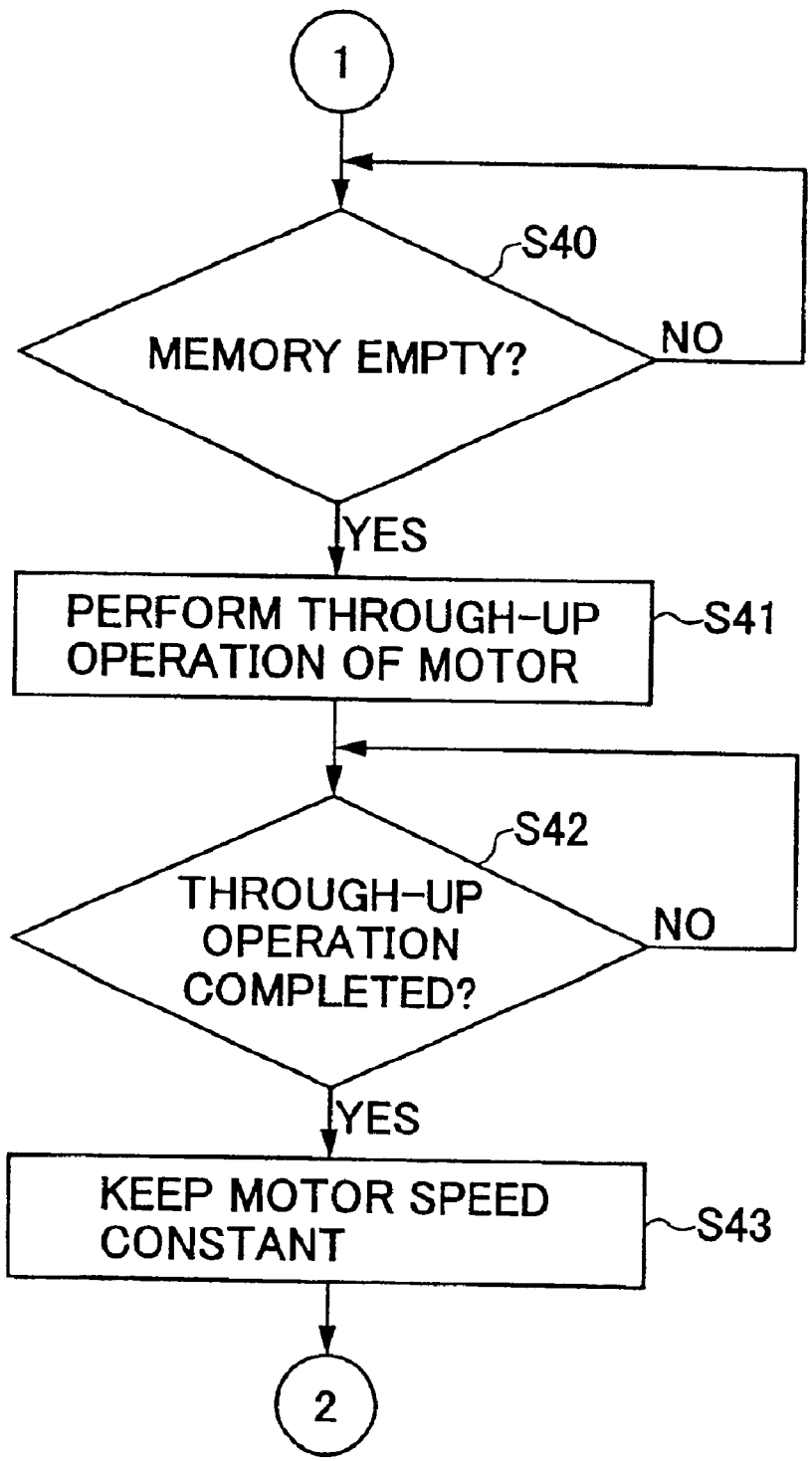
FIG. 15 is another flowchart of an intermittent reading operation of the color image scanner.

FIG. 12 is a timing chart of changes of speed of the stepper motor 17 in an image reading operation performed by means of the ADF 3. FIG. 13 is a timing chart of changes of speed of the stepper motor 17 and image reading in the case of occurrence of an intermittent operation. FIGS. 14 and 15 are flowcharts of the intermittent reading operation. This operation realizes the intermittent reading part.

In the intermittent reading operation by means of the ADF 3, the originals are conveyed. Therefore, the intermittent reading operation is performed as follows as shown in FIGS. 12, 14, and 15. In step S31, a through-up operation of the stepper motor 17 is performed. In step S32, it is determined whether the through-up operation is completed. The through-up operation is completed if the speed of the stepper motor 17 reaches a value at which an operation of reading the original images (an original image reading operation) is performed. If it is determined in step S32 that the through-up operation is completed, in step S33, the speed of the stepper motor 17 is kept constant at the value. After the first and second running bodies 10 and 13 reach their respective reading start positions, in step S34, the original image reading operation is started. In step S35, it is determined whether the original image reading operation is completed. If it is determined in step S35 that the original image reading operation is not completed, in step S36, it is determined whether the SDRAM is nearly full. If it is determined in step S36 that the SDRAM is nearly full and the interruption signal MEM NEAR FULL is output from the SIBC 55 of the SCU 19, in step S37, a through-down operation (an intermittent through-down operation) of the stepper motor 17 is performed. The interruption signal MEM NEAR FULL is output when the SDRAM is in the nearly full state where the SDRAM is nearly filled to its capacity to the extent that the SDRAM is not to be filled even if the original image reading operation is continued until the stepper motor 17 is stopped by a through-down operation. Then, in step S38, it is determined whether the through-down operation is completed. If it is determined in step S38 that the through-down operation is completed, in step S39, the stepper motor 17 is stopped.

The original image reading operation is also performed during the through-down operation of the stepper motor 17. As shown in FIG. 13, however, the original image reading operation is performed at a lower rate due to a decrease in the speed of the stepper motor 17, and the original image reading operation is interrupted when the stepper motor 17 is stopped. Thereafter, in step S40, it is determined whether the SDRAM is empty. If it is determined in step S40 that the SDRAM is empty, in step S41, the empty interruption signal MEM EMPTY output from the SIBC causes the CPU 60 to perform a through-up operation of the stepper motor 17 again. The empty interruption signal MEM EMPTY is output if the external apparatus such as a personal computer reads the image data through the SCSI-I/F of the color image scanner 1 so that no image data is stored in the SDRAM. Practically, a state of the SDRAM or an amount of the capacity of the SDRAM defined by a term "empty" is adjustable. Thereafter, in step S42, it is determined whether the through-up operation is completed. If it is determined in step S42 that the through-up operation is completed, in step S43, the speed of the stepper motor 17 is kept constant. Then, the operation returns to step S34, and the original image reading operation is restarted. During the through-up operation, the original image reading operation is performed at a lower rate, and when the speed of the stepper motor 17 is kept constant, the original image reading operation is performed at a normal rate. A period of time for which the stepper motor is stopped during the intermittent reading operation is affected by the processing capability of the external apparatus such as a personal computer. When the first and second running bodies 10 and 13 reach respective reading end positions, that is, if it is determined in step S35 that the original image reading operation is completed, in step S44, a through-down operation of the stepper motor 17 is performed. In step S45, it is determined whether the through-down operation is completed. If it is determined in step S45 that the through-down operation is completed, in step S46, the original is ejected, and in step S47, the stepper motor 17 is stopped.

Figure 16:
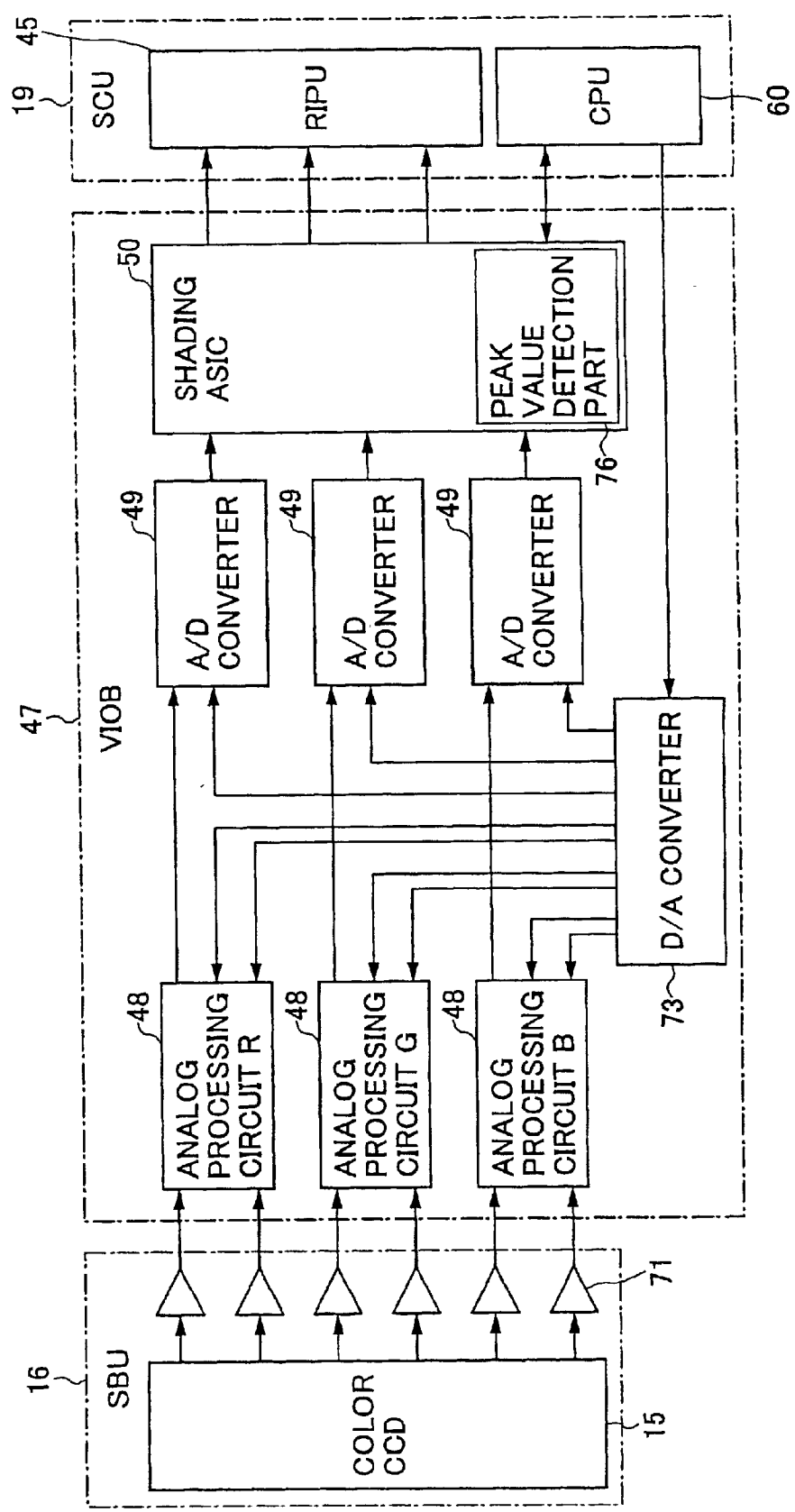
FIG. 16 is a block diagram showing a correction circuit for performing light amount variation correction of the color image scanner.

Next, a detailed description will be given, with reference to FIG. 16, of a correction circuit for performing the light amount variation correction on the lighting lamp 8. As shown in FIG. 16, each analog image signal, which is divided into even bits and odd bits to be photoelectrically converted in the CCD 15 on the SBU 16, is input to the VIOB 47 via a corresponding one of buffers 71 on the SBU 16. Each analog image signal divided into the even bits and odd bits is input to the corresponding one of the analog processing circuits 48 formed on the VIOB 47. Each analog image signal has its even bits and odd bits composed through a gain amplifier (not shown in the drawings) that can finely change the output level of each of the even bits and the odd bits, and is output as an analog image signal.

Each gain amplifier has its gain control terminal connected to a digital-to-analog (D/A) converter 73 by two channels so as to change a gain to each of the even bits and the odd bits of the corresponding analog image signal by changing the output voltage of the D/A converter 73 in analog. The CPU 60 formed on the SCU 19 sets the output level of the D/A converter 73. The D/A converter 73 has a reference voltage of five volts, and the number of bits of the D/A converter 73 is eight. Therefore, by the control of the CPU 60, the output voltage of the D/A converter 73 can be set to have 256 levels from zero to five volts. The CPU 60 sets the 255 levels of the output voltage in digital values (integers) from zero to 255.

Each analog image signal having its even bits and odd bits combined and output from the corresponding analog processing circuit 48 is input to the corresponding one of the A/D converters 49. The A/D converter 49 converts the corresponding analog image signal into the digital image signal of eight bits. Each A/D converter 49 has its reference setting terminal connected to the D/A converter 73. The digital output value of each A/D converter 49 can be changed by changing the output voltage of the D/A converter 73 in analog.

Each digital image signal (data) digitized in the corresponding A/D converter 49 is input to the shading ASIC 50. The shading ASIC 50 mainly performs the shading correction. In addition, the shading ASIC 50 includes a peak value detection part 76 that detects a peak value of one line in the main scanning direction Y. The peak value detection part 76 has a function of storing the peak value of one line. The CPU 60 provided on the SCU 19 and connected to the peak value detection part 76 can read the peak value of the one line in the main scanning direction Y stored in the peak value detection part 76. Further, the peak value detection part 76 can set a peak detection gate in any position on the one line in the main scanning direction Y so as to detect a peak value during the period of the peak detection gate. The CPU 60 provided on the SCU 19 sets this peak detection gate period. In this embodiment, the peak detection gate period is set in a position on the one line in the main scanning direction Y which position corresponds to a part in which the reference reflection member B is provided in the sub scanning direction X.

Here, a description will be given of a light amount variation correction operation that is characteristic among processing functions performed by the CPU 60 based on the control program under the above-described configuration. This operation realizes a light amount variation correction part.

Figure 17:
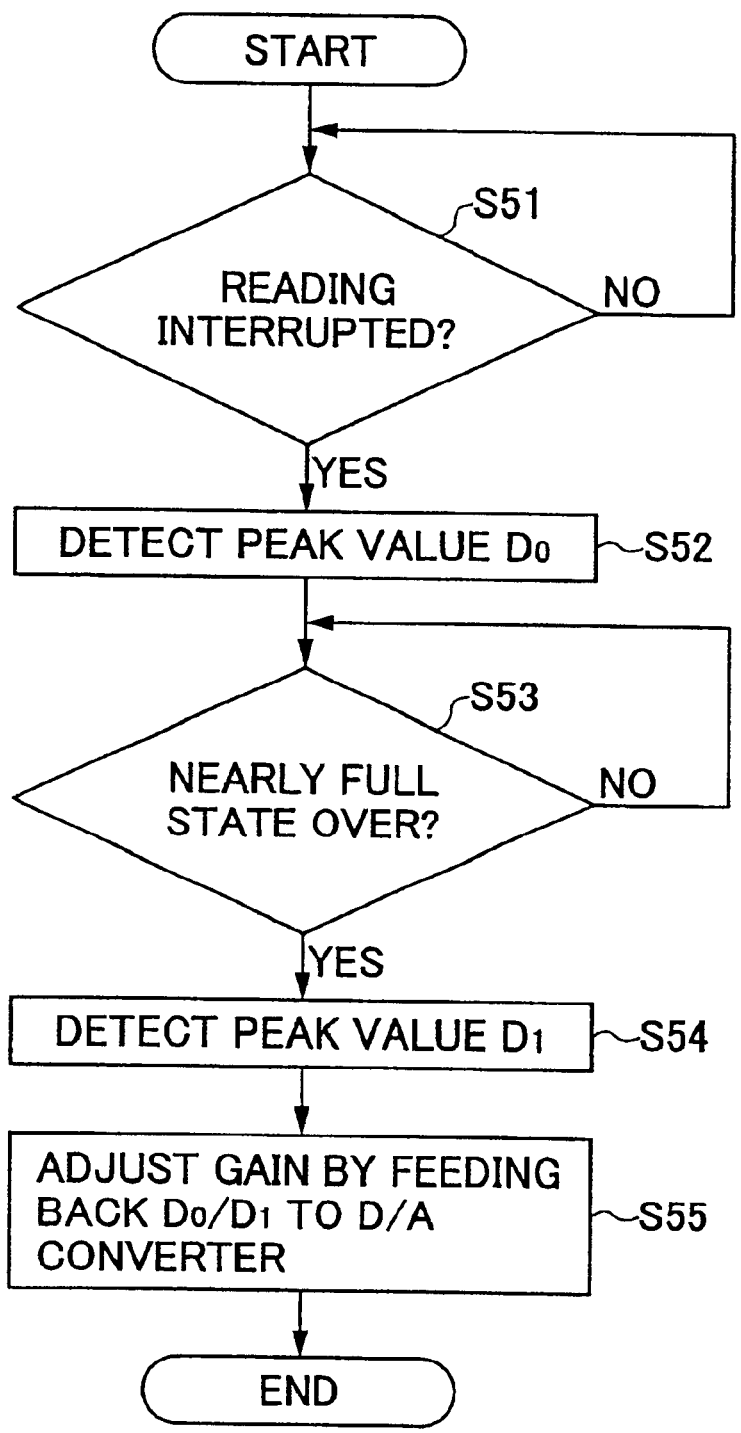
FIG. 17 is a schematic flowchart of a flow of a light amount variation correction operation.

FIG. 17 is a schematic flowchart of the light amount variation correction operation. As shown in FIG. 17, first, in step S51, it is determined whether an original image reading operation is interrupted or stopped with the SDRAM in the nearly full state. If it is determined in step S51 that the original image reading operation is interrupted or stopped, in step S52, the CPU 60 instructs the shading ASIC 50 to set a peak detection gate period and to start to detect a peak value, and the peak value detection part 76 of the shading ASIC 50 detects a peak value $D_0$ of a read image of the reference reflection member B provided in the sub scanning direction X and stores the detected peak value $D_0$.

Thereafter, in step S53, it is determined whether the nearly full state of the SDRAM is over. If it is determined in step S53 that the nearly full state of the SDRAM is over, in step S54, immediately before restarting the original image reading operation, the CPU 60 performs the same operation as in step S52, and detects and stores a peak value $D_1$.

In step S55, the CPU 60 feeds back a ratio of the peak value $D_0$ to the peak value $D_1$ ($D_0/D_1$) to the D/A converter 73 so that a gain (value) to the analog image signal in each analog processing circuit 48 is corrected for adjustment for the purpose of correcting a variation in an amount of light of the lighting lamp 8 while a scanning operation for image reading is stopped. The ratio of the peak value $D_0$ to the peak value $D_1$ ($D_0/D_1$) is an amount of attenuation (an inclination of attenuation) in an amount of light per unit time of each color component of each of the colors of R, G, and B.

Here, a description will be given of an idea of correcting the analog image signals in the analog processing circuits 48 by the CPU 60. In the following description, the analog processing circuit 48 represents any of the analog processing circuits 48, and the A/D converter 49 represents any of the A/D converters 49.

An analog image signal (an output signal of the analog processing circuit 48) Vout amplified by a certain gain (value) G in the analog processing circuit 48 is given by:

$$V\text{out} = G \times V\text{in}$$

where Vin represents the analog image signal.

Further, an eight-bit digital output value D of the A/D converter 49, which digitizes the analog image signal with a reference voltage thereof being a maximum output value, is given by:

$$D = (V\text{out}/V\text{ref}) \times 255$$

where Vref represents the reference voltage.

In the light amount variation of the lighting lamp 8 during a period for which the scanning operation for image reading is stopped, first, Vin changes, and then, Vout changes at a rate of change of Vin. Naturally, the digital output value D also changes. The color image scanner 1 of this embodiment performs the light amount variation correction by changing G so that Vout remains constant even if Vin changes. In other words, since Vout is constant, the following conditions should be satisfied:

$$V\text{out} = G_0 \times V\text{in}0 = G_1 \times V\text{in}1$$

where:

Vin0=Vin before the light amount variation of the lighting lamp 8

Vin1=Vin after the light amount variation of the lighting lamp 8

$G_0$=G before the light amount variation of the lighting lamp 8

$G_1$=G after the light amount variation of the lighting lamp 8

The peak values $D_0$ and $D_1$ of the read image of the reference reflection member B before and after the light amount variation of the lighting lamp 8, respectively, are values under a condition of $G=G_0$. Therefore, $G_1$ is given by:

$$G_1 = G_0 \times (D_0/D_1) \tag{1}$$

Therefore, $$V\text{out} = G_0 \times V\text{in}0 = G_1 \times V\text{in}1 = G_0 \times (D_0/D_1) \times V\text{in}1$$

Here, a relationship between a gain control voltage V of the gain control terminal of the analog processing circuit 48 which terminal is connected to the analog output of the D/A converter 73 and the gain G of the analog processing circuit 48 is defined by:

$$G = V \tag{2}$$

Since the number of bits of the D/A converter 73 is eight and the reference voltage thereof is five volts, a relationship between an analog output V of the D/A converter 73 and a digital input value C to the D/A converter 73 is given by:

$$V = (C/255) \times 5 = C/51 \tag{3}$$

The following equations are obtained from the above-described equations (1) through (3):

$$(C_1/51) = (C_0/51) \times (D_0/D_1) \quad C_1 = C_0 \times (D_0/D_1)$$

where:

$C_0$=C before the light amount variation of the lighting lamp 8

$C_1$=C after the light amount variation of the lighting lamp 8

Therefore, the CPU 60 should write a value obtained by multiplying the digital input value $C_0$ by "$D_0/D_1$" to the D/A converter 73.

By performing such a series of operations with respect to each of the colors of R, G, and B independently, differences in a light amount variation among the colors of R, G, and B can be absorbed. Here, the case of reading a color image is described. The same idea applies to a case of reading a monochrome image since data of one of the colors R, G, and B is employed therein.

As previously described, the peak values $D_0$ and $D_1$ are measured by reading the same position on the reference reflection member B since the first and second running bodies 10 and 13 are stopped. Further, since a variation in an amount of light during a period for which the first and second running bodies 10 and 13 are stopped is employed in this peak comparison calculation value ($D_0/D_1$), correction control is performable even if the reference reflection member B has non-uniform reflectivity. Further, the peak comparison calculation value is updated in every intermittent reading operation, the light amount variation correction of this embodiment characteristically has relatively good immunity to a noise resulting from contamination on the reference reflection member B.

Next, a description will be given of a variation of this embodiment. This variation differs in the idea of correcting the analog image signal in each analog processing circuit 48 by the CPU 60. A description will be given below of the idea of correcting the analog image signal by the CPU 60.

The analog image signal (the output signal of the analog processing circuit 48) Vout amplified by the certain gain G in the analog processing circuit is given by:

$$Vout = G \times Vin$$

where Vin represents the analog image signal.

Further, the eight-bit digital output value D of the A/D converter 49, which digitizes the analog image signal with the reference voltage being the maximum output value, is given by:

$$D = (Vout/Vref) \times 255$$

In the light amount variation of the lighting lamp 8 during the period for which the scanning operation for image reading is stopped, Vout changes and the digital output value D changes at the rate of change of Vout. The color image scanner 1 of this variation performs the light amount variation correction by changing Vref so that the eight-bit digital output value D remains constant even if Vout changes. In other words, since the eight-bit digital output value D is constant, the following conditions should be satisfied:

$$D = (Vout0/Vref0) \times 255 = (Vout1/Vref1) \times 255$$

where:

Vout0=Vout before the light amount variation of the lighting lamp 8

Vout1=Vout after the light amount variation of the lighting lamp 8

Vref0=Vref before the light amount variation of the lighting lamp 8

Vref1=Vref after the light amount variation of the lighting lamp 8

The peak values $D_0$ and $D_1$ of the read image of the reference reflection member B before and after the light amount variation of the lighting lamp 8, respectively, are values under a condition of Vref=Vref0. Therefore, Vref1 is given by:

$$Vref1 = Vref0 \times (D_1/D_0) \quad (4)$$

Therefore, $$D = (Vout0/Vref0) \times 255 = (Vout1/(Vref0 \times (D_1/D_0))) \times 255$$

Since the number of bits of the D/A converter 73 is eight and the reference voltage thereof is five volts, the relationship between the analog output V of the D/A converter 73 to the reference voltage Vref and the digital input value C to the D/A converter 73 is given by:

$$Vref(C/255) \times 5 = C/51 \quad (5)$$

The following equations are obtained from the above-described equations (4) and (5):

$$(C_3/51) = (C_2/51) \times (D_1/D_0) \quad C_3 = C_2 \times (D_1/D_0)$$

where:

$C_2$=C before the light amount variation of the lighting lamp 8

$C_3$=C after the light amount variation of the lighting lamp 8

Therefore, the CPU 60 should write a value obtained by multiplying the digital input value $C_2$ by "$D_1/D_0$" to the D/A converter 73.

By performing such a series of operations with respect to each of the colors of R, G, and B independently, differences in a light amount variation among the colors of R, G, and B can be absorbed. Here, the case of reading a color image is described. The same idea applies to a case of reading a monochrome image since data of one of the colors R, G, and B is employed therein.

As previously described, the peak values $D_0$ and $D_1$ are measured by reading the same position on the reference reflection member B since the first and second running bodies 10 and 13 are stopped. Further, since a variation in an amount of light during a period for which the first and second running bodies 10 and 13 are in an intermittent stop state (a state where the first and second running bodies 10 and 13 are stopped during an intermittent reading operation) is employed in this peak comparison calculation value ($D_0/D_1$), correction control is performable even if the reference reflection member B has non-uniform reflectivity. Further, the peak comparison calculation value is updated in every intermittent reading operation, the light amount variation correction of this variation characteristically has relatively good immunity to a noise resulting from contamination on the reference reflection member B.

In this embodiment, the reference reflection member B is provided on the far side (upper side in FIG. 2) in the main scanning direction Y of the sheet placement glass 5 below the sheet scale S1. However, the reference reflection member B may also be provided on the front side (lower side in FIG. 2) in the main scanning direction Y of the sheet placement glass 5.

Next, a description will be given, with reference to FIGS. 18 through 22, of a second embodiment of the present invention. In this embodiment, the same elements as those described in the first embodiment are referred to by the same numerals, and a description thereof will be omitted. In this embodiment, the light amount variation correction operation of the first embodiment is performed only when required. In other words, an object of the present invention in this embodiment is to minimize a decrease in throughput caused by a decrease in the image processing capability per unit time of the color image scanner 1 by performing the light amount variation correction operation only when required since the light amount variation correction operation is to be performed in a short period of time in an interval during motor control or image processing control and requires a large amount of load to be applied to the CPU 60.

Figure 18:
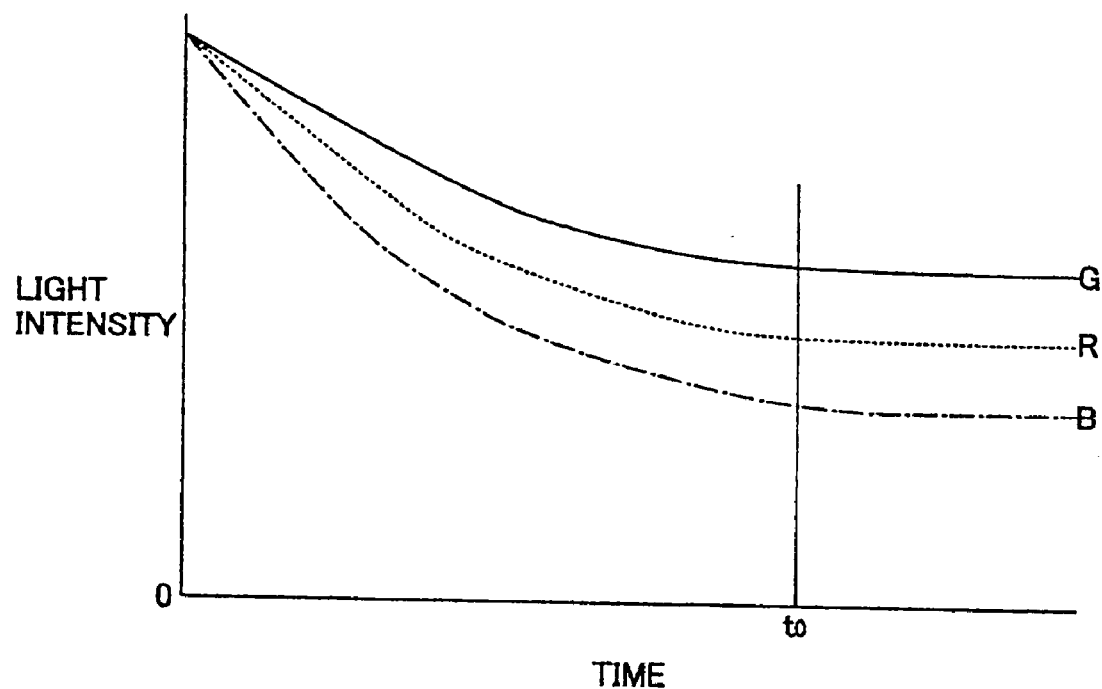
Figure 19:
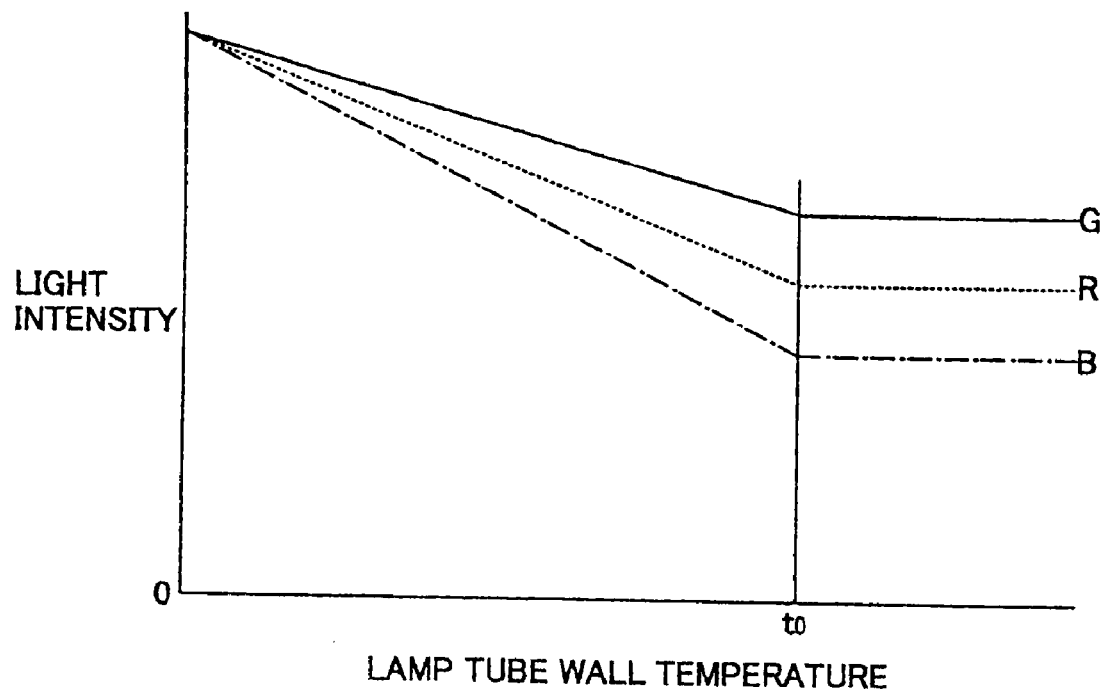

FIG. 18 is a graph showing a relationship between a period of time and intensity of light after the lighting lamp 8 is turned on. FIG. 19 is a graph showing a relationship between temperature of the lamp tube wall and intensity of light after the lighting lamp 8 is turned on. As shown in FIG. 18, the intensity of light is highest, or an amount of light is largest, immediately after the lighting lamp 8 is turned on. Thereafter, with the passage of time, the intensity of light, or the amount of light, is attenuated by a certain amount to be stabilized. Further, as shown in FIG. 19, as the temperature of the lamp tube wall increases, the intensity of light, or the amount of light, is attenuated by a certain amount to be stabilized. That is, it is not necessary to perform the light amount variation correction operation after the intensity of light, or the amount of light, is stabilized. Therefore, a condition for dispensing with the light amount variation correction operation is found to be that the intensity of light, or the amount of light, is constant.

In view of the above-described condition, a description will be given of a correction execution determination operation performed by the CPU 60 based on the control program.

The correction execution determination operation is performed prior to the above-described light amount variation correction operation. This correction execution determination operation realizes a correction execution determination part.

Figure 20:
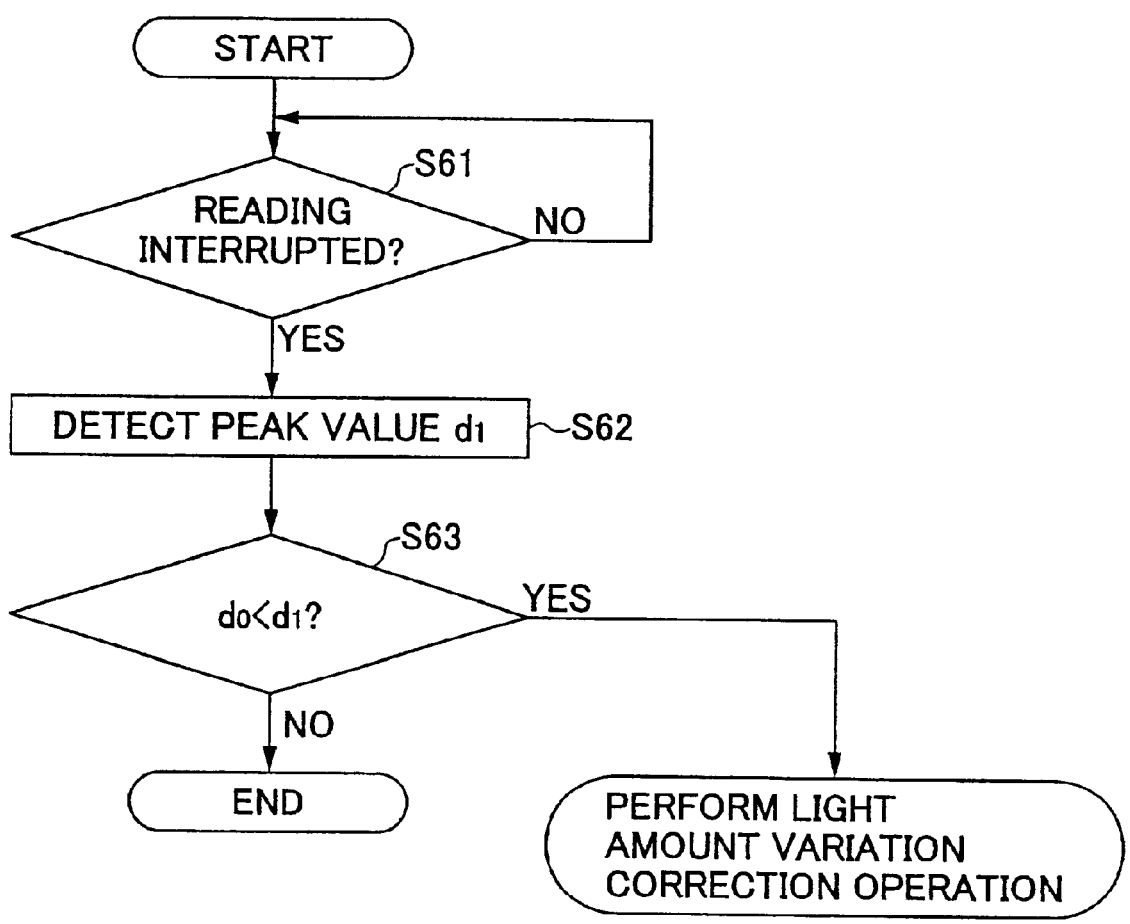
FIG. 20 is a schematic flowchart of a flow of a correction execution determination operation according to a second embodiment of the present invention.

FIG. 20 is a schematic flowchart of the correction execution determination operation. As shown in FIG. 20, first, in step S61, it is determined whether an original image reading operation is interrupted or stopped with the SDRAM being in a nearly full state. If it is determined in step S61, that the original image reading is interrupted or stopped, in step S62, the CPU 60 instructs the shading ASIC 50 to set a peak detection gate period and to start to detect a peak value, and the peak value detection part 76 of the shading ASIC 50 detects a peak value $d_1$ of a read image of the reference reflection member B provided in the sub scanning direction X and stores the detected peak value $d_1$.

Next, in step S63, the CPU 60 compares the measured peak value $d_1$ and a reference value $d_0$ indicating a peak value that reaches a point of stability of the intensity of light, or the amount of light, of the lighting lamp 8. The reference value $d_0$ is prestored in the EEPROM 65. If it is determined in step S63 that the reference value $d_0$ is larger than or equal to the measured peak value $d_1$, it is determined that the intensity of light, or the amount of light, is in a stable region, and the CPU 60 is prevented from performing the light amount variation correction operation. If it is determined in step S63 that the reference value $d_0$ is smaller than the measured peak value $d_1$, it is determined that the intensity of light, or the amount of light, is not in the stable region, and a routine of the light amount variation correction operation is entered so that the CPU 60 performs the light amount variation correction operation.

Figure 21:
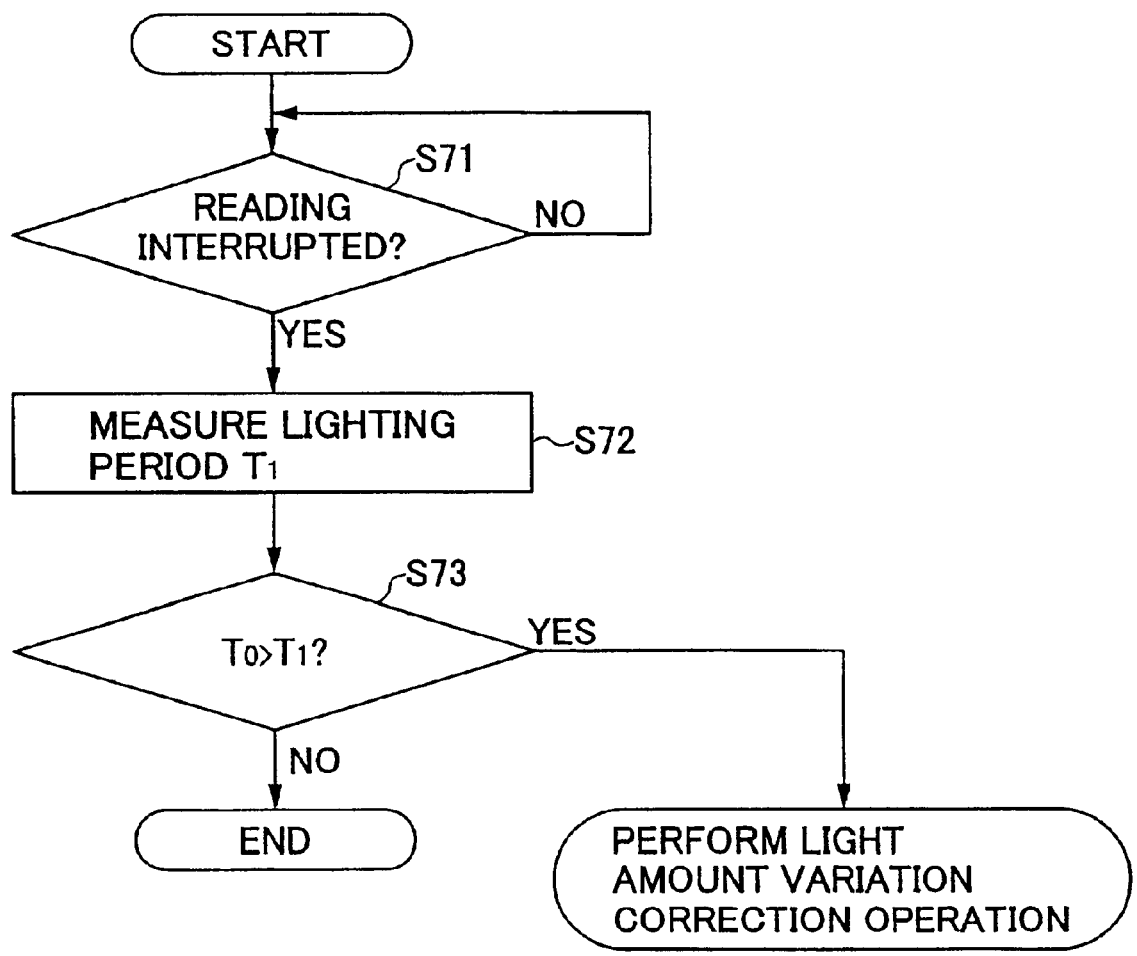
FIG. 21 is a flowchart of a variation of the correction execution determination operation.

Next, a description will be given, with reference to FIG. 21, of a first variation of this embodiment. As shown in FIG. 21, first, in step S71, it is determined whether an original image reading operation is interrupted or stopped with the SDRAM being in a nearly full state. If it is determined in step S71, that the original image reading is interrupted or stopped, in step S72, the CPU 60 measures a consecutive lighting period $T_1$ of the lighting lamp 8 by means of the timer T and stores the measured value.

Next, in step 73, the CPU 60 compares the measured peak value $T_1$ and a reference value $T_0$ indicating a consecutive lighting period that causes the intensity of light, or the amount of light, of the lighting lamp 8 to reach its point of stability. The reference value $T_0$ is prestored in the EEPROM 65. If it is determined in step S73 that the reference value $T_0$ is smaller than or equal to the measured value $T_1$, it is determined that the intensity of light, or the amount of light, is in the stable region, and the CPU 60 is prevented from performing the light amount variation correction operation. If it is determined in step S73 that the reference value $T_0$ is larger than the measured value $T_1$, it is determined that the intensity of light, or the amount of light, is not in the stable region, and the routine of the light amount variation correction operation is entered so that the CPU 60 performs the light amount variation correction operation.

Figure 22:
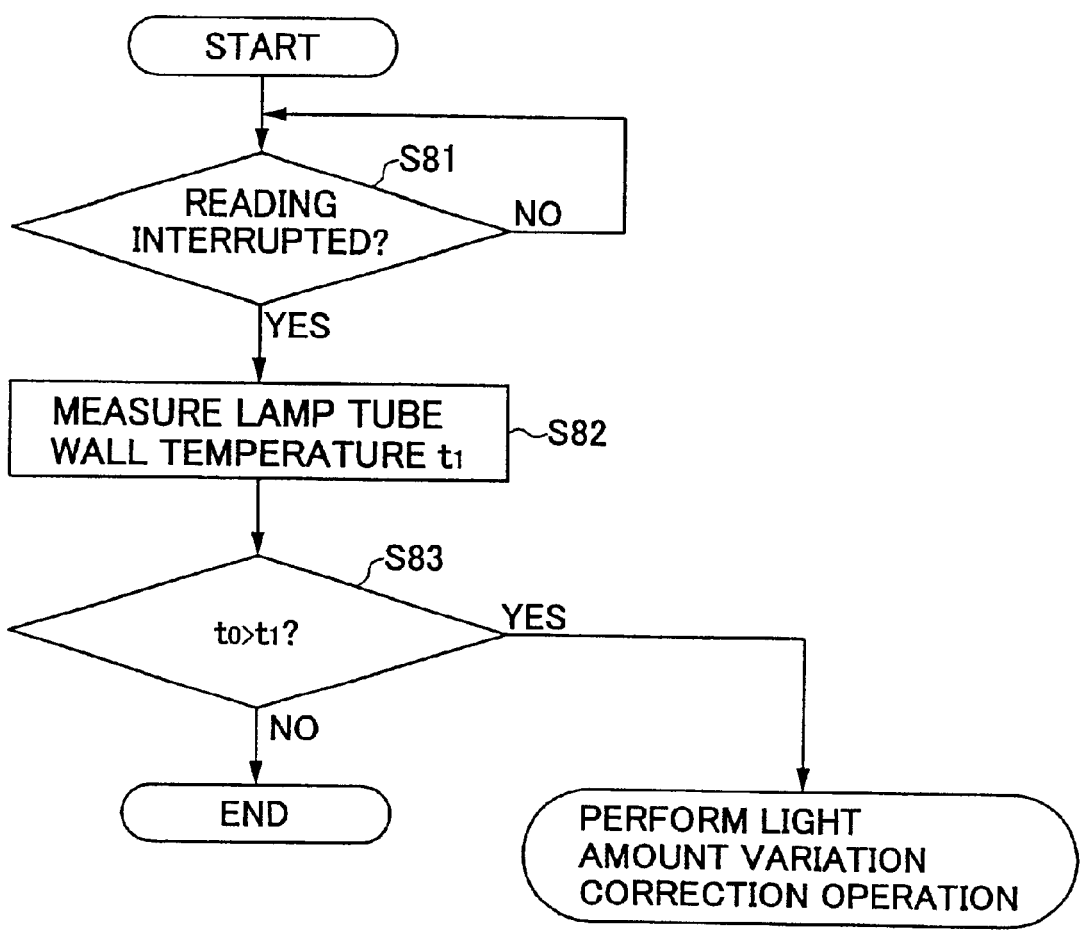
FIG. 22 is a flowchart of another variation of the correction execution determination operation.

Next, a description will be given, with reference to FIG. 22, of a second variation of this embodiment. As shown in FIG. 22, first, in step S81, it is determined whether an original image reading operation is interrupted or stopped with the SDRAM being in a nearly full state. If it is determined in step S71, that the original image reading is interrupted or stopped, in step S82, the CPU 60 measures a lamp tube wall temperature $t_1$ of the lighting lamp 8 by means of the temperature detection sensor 77 and stores the measured value.

Next, in step 83, the CPU 60 compares the measured value $t_1$ and a reference value $t_0$ indicating a lamp tube wall temperature at which the intensity of light, or the amount of light, of the lighting lamp 8 reaches its point of stability. The reference value $t_0$ is prestored in the EEPROM 65. If it is determined in step S83 that the reference value $t_0$ is smaller than or equal to the measured value $t_1$, it is determined that the intensity of light, or the amount of light, is in the stable region, and the CPU 60 is prevented from performing the light amount variation correction operation. If it is determined in step S83 that the reference value $t_0$ is larger than the measured value $t_1$, it is determined that the intensity of light, or the amount of light, is not in the stable region, and the routine of the light amount variation correction operation is entered so that the CPU 60 performs the light amount variation correction operation.

Next, a description will be given, with reference to FIG. 23, of a third embodiment of the present invention. In this embodiment, the same elements as those described in the first and second embodiments are referred to by the same numerals, and a description thereof will be omitted.

Figure 23:
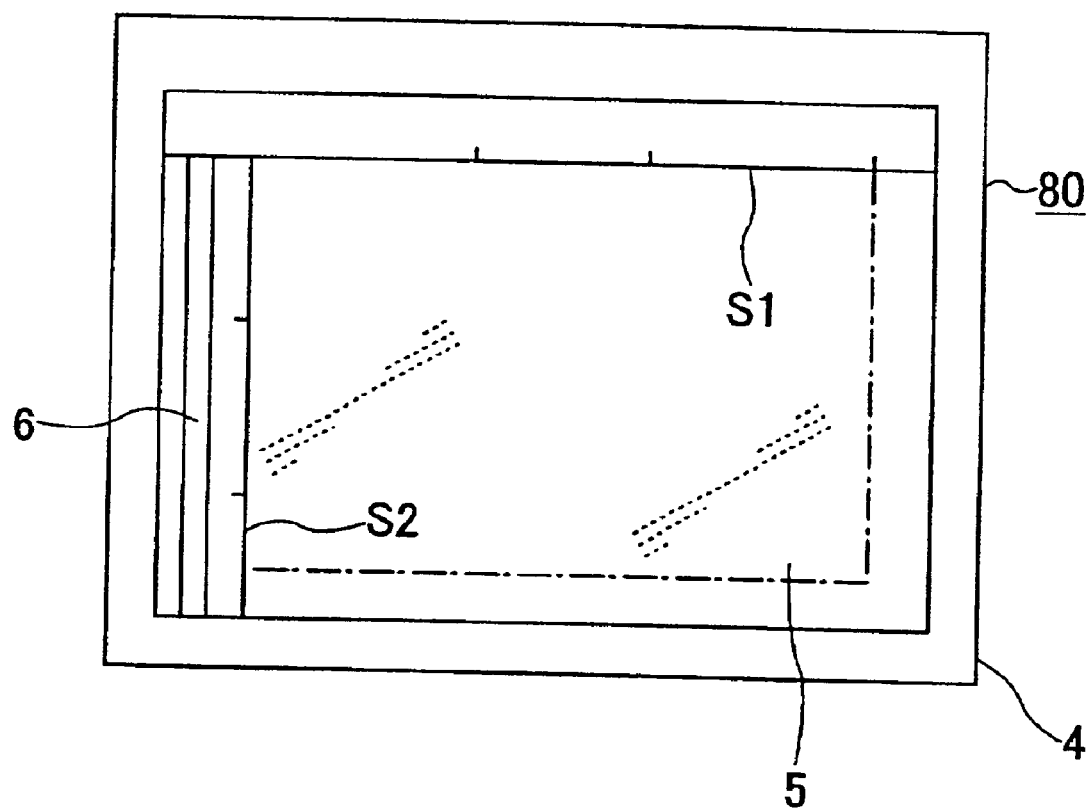
FIG. 23 is a plan view of a scanner main body and a neighborhood thereof according to a third embodiment of the present invention.

FIG. 23 is a plan view of a scanner main body 80 and its neighborhood. As shown in FIG. 23, unlike the previously described scanner main body 2, the reference reflection member B is not provided in the scanner main body 80.

This is because the correction control is performable without uniformity of the reference reflection member B since, as previously described, the peak values $D_0$ and $D_1$ are measured by reading the same position on the reference reflection member B with the first and second running bodies 10 and 13 being stopped and a variation in an amount of light during a period for which the first and second running bodies 10 and 13 are in the intermittent stop state is employed in the peak comparison calculation value. That is, any member that has a certain reflectivity and can be positioned so as to be illuminated by the lighting lamp 8 is employable as a reference reflection member provided in the sub scanning direction X.

Therefore, in this embodiment, the lower surface of the sheet scale S1 formed of, for instance, a metal member (a galvanized steel plate) is employed as the reference reflection member.

Further, the original sheet pressing member 3a provided at the bottom part of the ADF 3 is also usable as the reference reflection member. In the case of using the original sheet pressing member 3a provided at the bottom part of the ADF 3 as the reference reflection member, the lighting lamp 8 is required to illuminate a part of the original sheet pressing member 3a which part does not correspond to the original placed on the sheet placement glass 5. In such a case, a part of the original sheet pressing member 3a which part corresponds to a front side part (a lower side part in FIG. 2) of the sheet placement glass 5.

Since high reflection uniformity is not required of the reference reflection member, the sheet scale S1 or the original sheet pressing member 3a is employable as the reference reflection member. This reduces the number of components of the color image scanner 1 and lowers the production costs thereof.

Next, a description will be given, with reference to FIG. 24, of a fourth embodiment of the present invention. In this embodiment, the same elements as those described in the first through third embodiments are referred to by the same numerals, and a description thereof will be omitted.

Figure 24:
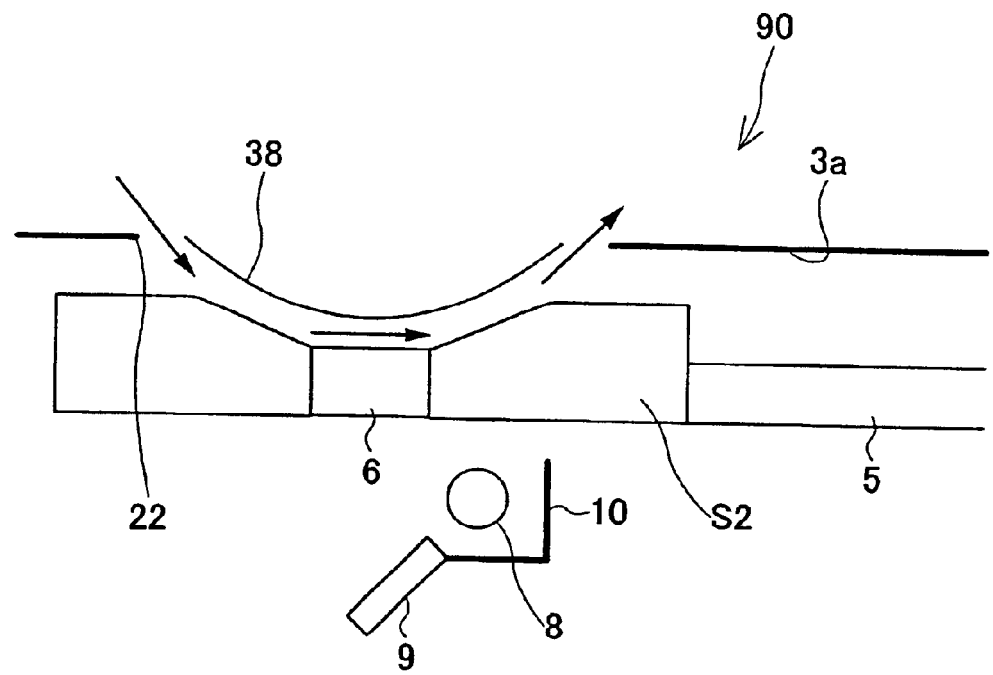
FIG. 24 is a sectional view of a conveyed-sheet glass and a neighborhood thereof of a scanner main body according to a fourth embodiment of the present invention.

FIG. 24 is a sectional view of the conveyed-sheet glass 6 and its neighborhood of a scanner main body 90. As shown in FIG. 24, unlike the scanner main body 2 of the first embodiment, the reference reflection member B is not provided at least in the neighborhood of the conveyed-sheet glass 6 in the scanner main body 90.

This is because the correction control is performable without uniformity of the reference reflection member B in the case of the sheet-conveying mode where the ADF is used since the same position on the reference reflection member B is read with the first and second running bodies 10 and 13 being stopped. That is, any member that has a certain reflectivity and can be positioned so as to be illuminated by the lighting lamp 8 is employable as a reference reflection member provided in the sub scanning direction X.

Therefore, in this embodiment, the lower surface of the sheet scale S2 formed of, for instance, a metal member (a galvanized steel plate) is employed as the reference reflection member in the case of the sheet-conveying mode.

Further, the lower surface of the guide member 38 provided above the conveyed-sheet glass 6 to form a part of the guide path 22 may also be used as the reference reflection member. In the case of using the lower surface of the guide member 38 as the reference reflection member, the lighting lamp 8 is required to illuminate a part of the guide member 38 which part does not correspond to the original fed from the ADF 3 in a direction indicated by arrows in FIG. 24. In such a case, a part of the guide member 38 which part corresponds to a front side part (a lower side part in FIG. 2) of the conveyed-sheet glass 6.

Since high reflection uniformity is not required of the reference reflection member, the sheet scale S2 or the guide member 38 is employable as the reference reflection member. This reduces the number of components of the color image scanner 1 and lowers the production costs thereof.

Figure 25:
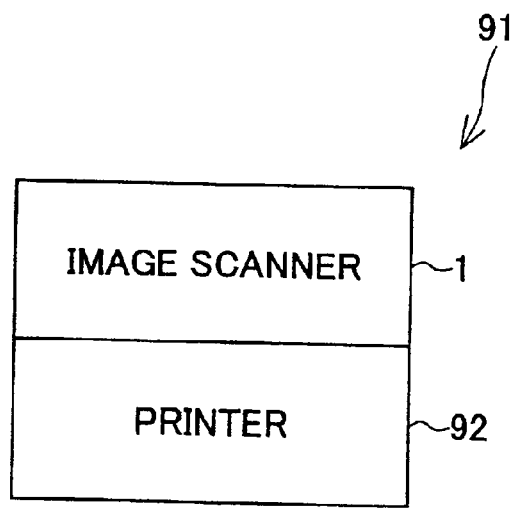
FIG. 25 is a block diagram showing an overall structure of a copier according to a fifth embodiment of the present invention.

Next, a description will be given, with reference to FIG. 25, of a fifth embodiment of the present invention. In this embodiment, the same elements as those described in the first through fourth embodiments are referred to by the same numerals, and a description thereof will be omitted. FIG. 25 is a block schematic diagram showing a copier 91. The copier 91 includes the color image scanner 1 and a printer 92 that is an imaging apparatus forming an image on a sheet of paper by, for instance, electrophotography based on image data that the color image scanner 1 reads from the images of the originals. In addition to electrophotography, a variety of printing methods such as an ink jet method, sublimation heat transfer, silver bromide photography, direct thermal recording, and thermal transfer are applicable to the printer 92. Since a specific structure of the copier 91 is well known, a description thereof will be omitted.

According to the copier 91, the same effects as those of any of the first through fourth embodiments are producible.

The present invention is not limited to the specifically disclosed embodiments, but variations and modifications may be made without departing from the scope of the present invention.

The present application is based on Japanese Laid-Open Patent Application No. 2000-329413 filed on Oct. 27, 2000, the entire contents of which are hereby incorporated by reference.

What is claimed is:

1. An image reading apparatus comprising:
   a line sensor configured to read an image of an original;
   a scanning optical system comprising a light source configured to illuminate the original and, the scanning optical system configured to scan the original;
   a reference reflection member configured to reflect a light emitted from the light source;
   a buffer memory configured to store data of the image read by said line sensor;
   intermittent reading means for interrupting and restarting scanning performed by said scanning optical system based on a residual storage capacity of said buffer memory; and
   light amount variation correction means for correcting a variation in an amount of light of the light source during an interruption of the scanning due to insufficiency of the residual storage capacity based on an amount of reflected light from said reference reflection member.

2. The image reading apparatus as claimed in claim 1, wherein said light amount variation correction means is configured to correct the variation in the amount of light of the light source by changing an amount of signal amplification for an analog signal output from said line sensor.

3. The image reading apparatus as claimed in claim 2, wherein said light amount variation correction means is configured to correct the variation in the amount of light of the light source based on a relative value of a first amount of reflected light from said reference reflection member to a second amount of reflected light from the reference reflection member, the first and second amounts being detected at different times.

4. The image reading apparatus as claimed in claim 1, wherein said light amount variation correction means is configured to correct the variation in the amount of light of the light source by changing a reference voltage of an A/D converter digitizing an analog signal output from said line sensor.

5. The image reading apparatus as claimed in claim 4, wherein said light amount variation correction means is configured to correct the variation in the amount of light of the light source based on a relative value of a first amount of reflected light from said reference reflection member to a second amount of reflected light from the reference reflection member, the first and second amounts being detected at different times.

6. The image reading apparatus as claimed in claim 1, further comprising correction execution determination means for causing said light amount variation correction means to correct the variation in the amount of light of the light source under predetermined conditions.

7. The image reading apparatus as claimed in claim 6, wherein said correction execution determination means is configured to caused said light amount variation correction means to correct the variation in the amount of light of the light source only if a peak value of the data of the image read by said line sensor is larger than a predetermined value.

8. The image reading apparatus as claimed in claim 6, wherein said correction execution determination means is configured to cause said light amount variation correction means to correct the variation in the amount of light of the light source only if a consecutive lighting period of the light source is smaller than a predetermined value.

9. The image reading apparatus as claimed in claim 6, wherein said correction execution determination means is configured to cause said light amount variation correction means to correct the variation in the amount of light of the light source only if a temperature of the light source is smaller than a predetermine value.

10. The image reading apparatus as claimed in claim 1, wherein said reference reflection member extends in a sub scanning direction perpendicular to a main scanning direction in which said line sensor extends and has a length larger than or equal to a maximum readable length of the original.

11. The image reading apparatus as claimed in claim 10, wherein said reference reflection member comprises a sheet placement glass fixing member configured to be fixed to a sheet placement glass on which the original is placed.

12. The image reading apparatus as claimed in claim 10, wherein said reference reflection member comprises a sheet size informing member configured to indicate a size of the original placed on sheet placement glass.

13. The image reading apparatus as claimed in claim 10, wherein said reference reflection member comprises a pressing plate configured to press the original placed on a sheet placement glass.

14. The image reading apparatus as claimed in claim 1, further comprising an automatic document feeder configured to feed the original automatically above said scanning optical system at a timing that matches the interruption and a restart of the scanning, wherein said scanning optical system is disposed in a predetermined position.

15. The image reading apparatus as claimed in claim 14, wherein said reference reflection member comprises a conveyed-sheet glass fixing member configured to be fixed to a conveyed-sheet glass provided above the predetermined position in which said scanning optical system is disposed.

16. The image reading apparatus as claimed in claim 14, wherein said reference reflection member comprises a conveying path formation member configured to form a conveying path conveying the original, the conveying path formation member provided in said automatic document feeder above a conveyed-sheet glass provided above the given predetermined position in which said scanning optical system is disposed.

17. A copier comprising:
an image reading apparatus, said image reading apparatus comprising:
a line sensor configured to read an image of an original;
a scanning optical system comprising a light source configured to illuminate the original and, the scanning optical system configured to scan the original;
a reference reflection member configured to reflect a light emitted from the light source;
a buffer memory configured to store data of the image read by said line sensor;
intermittent reading means for interrupting and restarting scanning performed by said scanning optical system based on a residual storage capacity of said buffer memory; and
light amount variation correction means for correcting a variation in an amount of light of the light source during an interruption of the scanning due to insufficiency of the residual storage capacity based on an amount of reflected light from said reference reflection member; and
an imaging apparatus configured to form an image on a sheet of paper based on the data of the image read by said image reading apparatus.

18. An image reading apparatus comprising:
a line sensor configured to read an image of an original;
a scanning optical system comprising a light source configured to illuminate the original and, the scanning optical system configured to scan the original;
a reference reflection member configured to reflect a light emitted from the light source;
a buffer memory configured to store data of the image read by said line sensor;
an intermittent reading part configured to interrupt and to restart scanning performed by said scanning optical system based on a residual storage capacity of said buffer memory; and
a light amount variation correction part configured to correct a variation in an amount of light of the light source during an interruption of the scanning due to insufficiency of the residual storage capacity based on an amount of reflected light from said reference reflection member.

19. The image reading apparatus as claimed in claim 18, wherein said light amount variation correction part is configured to correct the variation in the amount of light of the light source by changing an amount of signal amplification for an analog signal output from said line sensor.

20. The image reading apparatus as claimed in claim 19, wherein said light amount variation correction part is configured to correct the variation in the amount of light of the light source based on a relative value of first amount of reflected light from said reference reflection member to a second amount of reflected light from the reference reflection member, the first and second amounts being detected at different times.

21. The image reading apparatus as claimed in claim 18, wherein said light amount variation correction part is configured to correct the variation in the amount of light of the light source by changing a reference voltage of an A/D converter digitizing an analog signal output from said line sensor.

22. The image reading apparatus as claimed in claim 21, wherein said light amount variation correction part is configured to correct the variation in the amount of light of the light source based on a relative value of first amount of reflected light from said reference reflection member to a second amount of reflected light from the reference reflection member, the first and second amounts being detected at different times.

23. The image reading apparatus as claimed in claim 18, further comprising a correction execution determination part configure to cause said light amount variation correction part to correct the variation in the amount of light of the light source under predetermined conditions.

24. The image reading apparatus as claimed in claim 23, wherein said correction execution determination part is configured to cause said light amount variation correction part to correct the variation in the amount of light of the light source only if a peak value of the data of the image read by said line sensor is larger than a predetermined value.

25. The image reading apparatus as claimed in claim 23, wherein said correction execution determination part is configured to cause said light amount variation correction part to correct the variation in the amount of light of the light source only if a consecutive lighting period of the light source is smaller than a predetermined value.

26. The image reading apparatus as claimed in claim 23, wherein said correction execution determination part is configured to cause said light amount variation correction part to correct the variation in the amount of light of the light source only if a temperature of the light source is smaller than a predetermined value.

27. The image reading apparatus as claimed in claim 18, wherein said reference reflection member extends in a sub scanning direction perpendicular to a main scanning direction in which said line sensor extends and has a length larger than or equal to a maximum readable length of the original.

28. The image reading apparatus as claimed in claim 27, wherein said reference reflection member comprises a sheet placement glass fixing member configured to be fixed to a sheet placement glass on which the original is placed.

29. The image reading apparatus as claimed in claim 27, wherein said reference reflection member comprises a sheet size informing member configured to indicate a size of the original placed on sheet placement glass.

30. The image reading apparatus as claimed in claim 27, wherein said reference reflection member comprises a pressing plate configured to press the original placed on a sheet placement glass.

31. The image reading apparatus as claimed in claim 18, further comprising an automatic document feeder configured to feed the original automatically above said scanning optical system at a timing that matches the interruption and a restart of the scanning, wherein said scanning optical system is disposed in a predetermined position.

32. The image reading apparatus as claimed in claim 31, wherein said reference reflection member comprises a conveyed-sheet glass fixing member configured to be fixed to a conveyed-sheet glass provided above the predetermined position in which said scanning optical system is fixed.

33. The image reading apparatus as claimed in claim 31, wherein said reference reflection member comprises a conveying path formation member configured to form a conveying path conveying the original, the conveying path formation member provided in said automatic document feeder above a conveyed-sheet glass provided above the predetermined position in which said scanning optical system is disposed.

34. A copier comprising:
an image reading apparatus, said image reading apparatus comprising:
  a line sensor configured to read an image of an original;
  a scanning optical system comprising a light source configured to illuminate the original and, the scanning optical system configured to scan the original;
  a reference reflection member configured to reflect a light emitted from the light source;
  a buffer memory configured to store data of the image read by said line sensor;
  an intermittent reading part configured to interrupt and to restart scanning performed by said scanning optical system based on a residual storage capacity of said buffer memory; and
  a light amount variation correction part configured to correct a variation in an amount of light of the light source during an interruption of the scanning due to insufficiency of the residual storage capacity based on an amount of reflect light from said reference reflection member; and
an imaging apparatus configured to form an image on a sheet of paper based on the data of the image read by said image reading apparatus.

* * * * *